(12) United States Patent
Yakuwa et al.

(10) Patent No.: US 9,880,923 B2
(45) Date of Patent: Jan. 30, 2018

(54) MODEL CHECKING DEVICE FOR DISTRIBUTED ENVIRONMENT MODEL, MODEL CHECKING METHOD FOR DISTRIBUTED ENVIRONMENT MODEL, AND MEDIUM

(71) Applicant: NEC Corporation, Minato-ku, Tokyo (JP)

(72) Inventors: Yutaka Yakuwa, Tokyo (JP); Nobuyuki Tomizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/110,478

(22) PCT Filed: Aug. 21, 2014

(86) PCT No.: PCT/JP2014/071844
§ 371 (c)(1),
(2) Date: Jul. 8, 2016

(87) PCT Pub. No.: WO2015/107711
PCT Pub. Date: Jul. 23, 2015

(65) Prior Publication Data
US 2016/0335170 A1    Nov. 17, 2016

(30) Foreign Application Priority Data

Jan. 17, 2014   (JP) ................... 2014-007068

(51) Int. Cl.
   *G06F 11/36*   (2006.01)
   *G06F 11/30*   (2006.01)

(52) U.S. Cl.
   CPC ......... *G06F 11/3608* (2013.01); *G06F 11/30* (2013.01); *G06F 11/36* (2013.01)

(58) Field of Classification Search
   None
   See application file for complete search history.

(56) References Cited

U.S. PATENT DOCUMENTS 9,244,510 B1 *   1/2016   Conrad ................... G06F 11/30
9,442,701 B1 *   9/2016   Aldrich ..................... G06F 8/34
(Continued)

OTHER PUBLICATIONS

Gammie et al., "MCK: Model Checking the Logic of Knowledge," 2004, R. Alur and D.A. Peled (Eds.): CAV 2004, LNCS 3114, pp. 479-483.*

(Continued)

*Primary Examiner* — Tuan Q. Dam
*Assistant Examiner* — Stephen Berman

(57) ABSTRACT

A model checking device for a distributed-environment-model according to the present invention, includes: a distributed-environment-model search unit that adopts a first state as start point when obtaining information indicating a distributed-environment-model, searches the state attained by the distributed-environment-model by executing straight line movements for moving from the first state to a second state which is an end position, and determines whether the searched state satisfies a predetermined property; a searched state management unit that stores the searched state in the past; a searched-transition-history management unit that stores an order of the transitions of the straight line movements in the past; a searched state transition association information management unit that stores the transition when moving to another state in the past search in such a manner that the transition is associated with each of the searched states.

8 Claims, 15 Drawing Sheets

(56) References Cited

U.S. PATENT DOCUMENTS

| | | | | |
|---|---|---|---|---|
| 2007/0283338 | A1* | 12/2007 | Gupta | G06F 11/36 717/154 |
| 2008/0034351 | A1* | 2/2008 | Pugh | G06F 11/36 717/128 |
| 2008/0282221 | A1* | 11/2008 | Kahlon | G06F 11/3608 717/105 |
| 2009/0204968 | A1* | 8/2009 | Kahlon | G06F 11/30 718/100 |
| 2009/0276469 | A1* | 11/2009 | Agrawal | G06F 11/30 |
| 2009/0282288 | A1 | 11/2009 | Wang et al. | |
| 2009/0307664 | A1* | 12/2009 | Huuck | G06F 11/3608 717/124 |
| 2010/0305919 | A1* | 12/2010 | Ganai | G06F 11/3608 703/2 |
| 2012/0233599 | A1* | 9/2012 | Valdiviezo Basauri | G06F 11/3608 717/126 |
| 2012/0311542 | A1* | 12/2012 | Wu | G06F 11/3608 717/128 |
| 2013/0304755 | A1* | 11/2013 | Zhou | G06F 11/3608 707/758 |
| 2015/0074652 | A1* | 3/2015 | Chockler | G06F 11/3608 717/126 |

OTHER PUBLICATIONS

Andrews et al., "Zing: A Model Checker for Concurrent Software," R. Alur and D.A. Peled (Eds.): CAV 2004, LNCS 3114, pp. 484-487.*

Brim et al., "Distributed LTL Model Checking Based on Negative Cycle Detection", 2001, R. Hariharan, M. Mukund, and V. Vinay (Eds.): FSTTCS 2001, LNCS 2245, pp. 96-107.*

Sabetzadeh, Mehrdad et al. "Global consistency checking of distributed models with TReMer+," 2008, Proceedings of the 30th international conference on Software engineering, pp. 815-818.*

Jaghoori, Mohammad Mandi et al., "Modere: the model-checking engine of Rebeca,"2006, Proceedings of the 2006 ACM symposium on Applied computing, pp. 1810-1815.*

Lerda, Flavio et al., "Addressing dynamic issues of program model checking," 2001, Proceedings of the 8th international SPIN workshop on Model checking of software, pp. 80-102.*

Marco Canini, Daniel Venzano, Peter peresini, and Dejan Kostic, "A NICE Way to Test OpenFlow Applications", 9th USENIX Symposium on Networked Systems Design and Implementation (NSDI), Apr. 25-27, 2012.

Vick McKeown, Tom Anderson, Hari Balakrishnan, Guru Parulkar, Larry Peterson, Jennifer Rexford, Scott Shenker, Jonathan Turner, "OpenFlow: Enabling Innovation in Campus Networks", Acm Sigcomm Computer Communication Review, vol. 38, No. 2, pp. 69-74, Apr. 2008.

"OpenFlow Switch Specification Version 1.0.0 (Wire Protocol 0x01)", Dec. 31, 2009, Open Networking Foundation, internet <URL: http://www.openflow.org/documents/openflow-spec-v1.0.0.pdf>.

Cormac Flanagan, Patrice Godefroid, "Dynamic partial-order reduction for model checking software", POPL '05 Proceedings of the 32nd ACM SIGPLAN-SIGACT symposium on Principles of programming languages, pp. 110-121, ACM New York, Jan. 2005.

Yu Yang, Xiaofang Chen, Ganesh Gopalakrishnan, Robert M. Kirby, "Efficient Stateful Dynamic Partial Order Reduction", "Model Checking Software", Book Subtitle "15th International SPIN Workshop, Los Angeles, CA, USA, Aug. 10-12, 2008 Proceedings", vol. 5156 of the series Lecture Notes in Computer Science, pp. 288-305, 2008.

Maysam Yabandeh, Dejan Kostic, "DPOR-DS: Dynamic Partial Order Reduction in Distributed Systems", School of Computer and Communication Sciences, EPFL, Switzerland, EPFL Technical Report NSL-Report-2009-005, 2009.

Yutaka Yakuwa, Nobuyuki Tomizawa, Toshio Tonouchi, "Model Checking of OpenFlow Network with Abstraction of Packets Based on Symbolic Execution", Technical Report of the Institute of Electronics, Information and Communication Engineers, Jul. 11, 2013, vol. 5 113, No. 140, pp. 107 to 112, (IN2013-54).

International Search Report for PCT Application No. PCT/JP2014/071844, dated Oct. 7, 2014.

English translation of Written opinion for PCT Application No. PCT/JP2014/071844.

* cited by examiner

Fig. 12
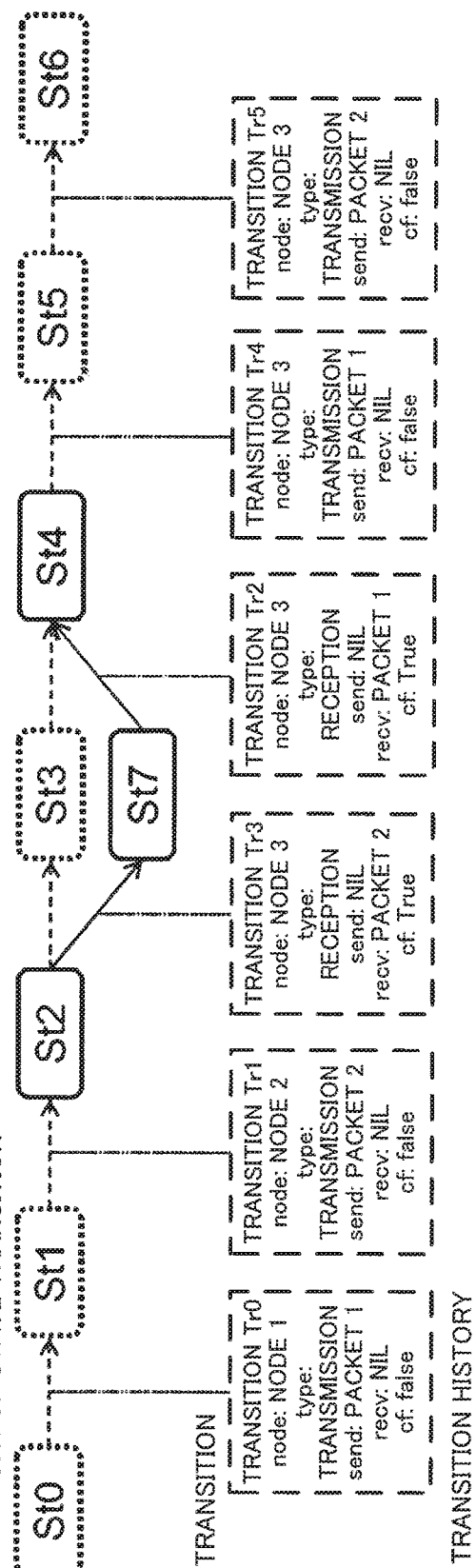
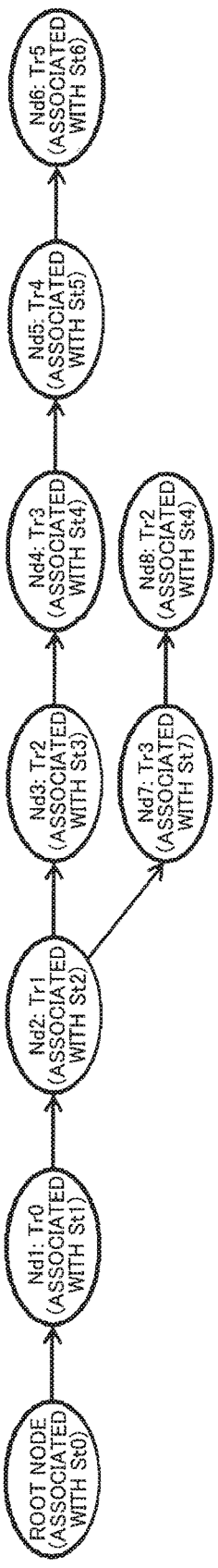

Fig. 15
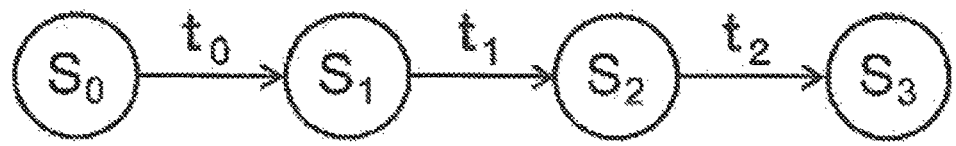
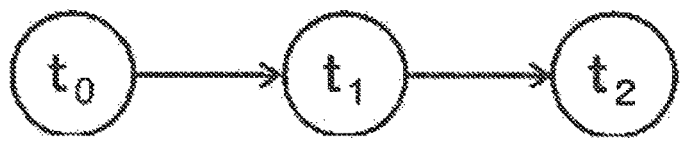
Fig. 16
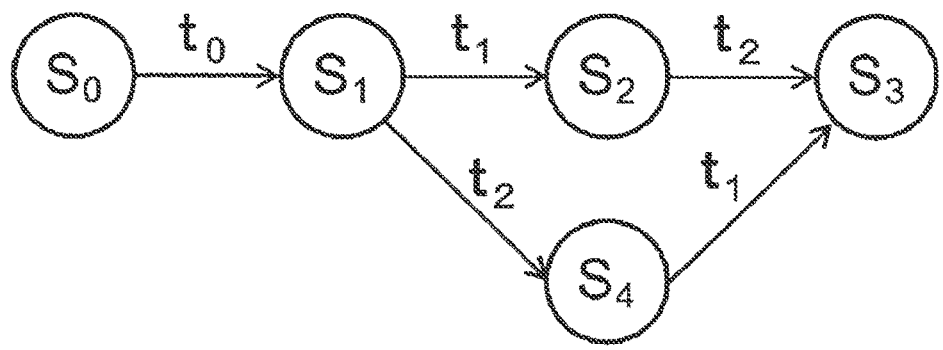
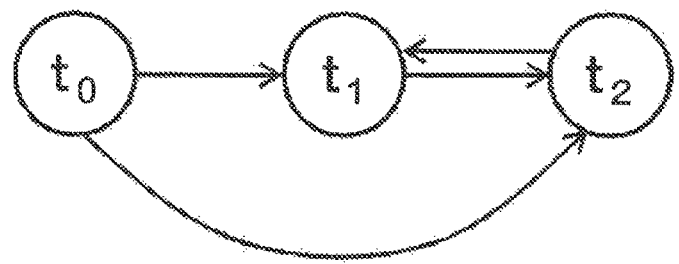

MODEL CHECKING DEVICE FOR DISTRIBUTED ENVIRONMENT MODEL, MODEL CHECKING METHOD FOR DISTRIBUTED ENVIRONMENT MODEL, AND MEDIUM

This application is a National Stage Entry of PCT/JP2014/071844 filed on Aug. 21, 2014, which claims priority from Japanese Patent Application 2014-007068 filed on Jan. 17, 2014, the contents of all of which are incorporated herein by reference, in their entirety.

TECHNICAL FIELD

The present invention relates to a model checking device for a distributed-environment-model, a model checking method for a distributed-environment-model, and a program.

BACKGROUND ART

In recent years, a verification method based on a model checking is known as a verification method of a system and software. The model checking is a technique for verifying whether a verification target satisfies a specification by making a verification target into a model as a state transition system and exhaustively searching the model. The model checking can be applied from a design stage, and can guarantee whether the verification target satisfies the specification or not, and therefore, the model checking attracts attention as a technique for improving the reliability of the system and the software.

Recently, an attempt is made to apply the model checking to verification of a network. For example, NPL 1 discloses a technique in which, when a state search of a network controlled by a technique called OpenFlow (see NPLs 2, 3) is performed with the model checking, a program of an OpenFlow controller is symbolically executed, and a set of representing values of packets for executing all the code paths is derived, and the state search is performed by using the set.

The model checking has the above features, but has a problem in that a memory and a time required for calculation increases in an exponential manner with respect to the scale of the verification target. Therefore, in the model checking for the purpose of practically verifying a system and software, it is essential to increase the efficiency of the search.

For example, NPL 4 discloses DPOR (Dynamic Partial Order Reduction) which is a technique for pruning redundant searches from the perspective of verification in model checking of a multi-thread environment model.

When a state transition system of a model checking target is searched with the DPOR, a transition is initially made between states in one suitable path. Then, with the DPOR, a determination is made as to whether there exists a pair of transitions in which execution orders of each other affect an execution result in the transition series of the path. The pair of such transitions will be referred to as transitions having dependency. In a case where the transitions having dependency exist, for searching with making transition between the states in the path in which the execution order of the pair is switched, a backtrack location indicating the position where a new search is started is generated in that path. For example, a state immediately before one of the pair of transitions having dependency whichever is performed first is searched from the paths in which the search is executed previously, and this state is adopted as the backtrack location.

Then, when all the transitions having dependency is detected from the previous path, the search is resumed from the backtrack location at the rearmost on the path. This procedure is repeated until no more backtrack location is generated. Therefore, from among all the execution patterns of the verification target, only the path of which execution results is different can be searched. In other words, a search for a path of which verification result is not different, i.e., a search for a redundant path from the perspective of verification, can be pruned, so that the efficiency of the search can be enhanced.

NPL 5 discloses SDPOR which is a technique obtained by improving the DPOR. In the model checking, in general, when a state in which a search has been performed in the past (searched state) is attained again, a search after the state is terminated because the search is of course redundant. However, with the DPOR, easily terminating the search causes to affect an analysis of the transition having dependency on the path, and a correct result cannot be obtained. Therefore, with the DPOR, even if a searched state is attained, the search is not terminated and is continued.

The SDPOR is an improved DPOR that is configured to be able to terminate the search when the searched state is attained. With the SDPOR, transitions performed in the search in the past are managed with a graph, which is used for the analysis of the dependency. In the graph, a transition is associated with each node, and each directed edge represents an execution order of a transition performed in the search in the past. For example, it is assumed that a state immediately after a transition t1 performed in a search is s1, and when a transition t2 is performed further from s1, a directed edge is drawn from the node n1 associated with the transition t1 in the graph to a node n2 associated with the transition t2 (when the nodes n1 and n2 do not exist in the graph, the nodes n1 and n2 are generated).

With the SDPOR, when the state s2 searched in the past is reached, a transition that can be performed from the state s2 is investigated, and a node associated with the transition is searched from the graph, and further, all the nodes that can be reached by tracking the directed edge from the node are extracted. The transition associated with the node extracted above represents a transition that can be executed in a state transition of s2 or later. By analyzing the dependency by using these transitions and a transition on the current path, a backtrack location is generated. The advantage of the SDPOR is that, with these procedures, even when a search after the searched state is terminated, the dependency can be correctly analyzed, and the efficiency can be improved due to the termination of the search.

NPL 6 discloses DPOR-DS which is a technique obtained by correcting the DPOR for a model checking of a distributed-environment-model. For absorbing the difference in an environment of a model of a verification target, a method for generating the backtrack location is changed. A happens-before relation in the distributed-environment-model is defined separately from dependency with regard to a relation between transitions on an execution path, and this is used for determination of generation of the backtrack location. The happens-before relation is a relation in an execution order between transitions that are always satisfied in a certain model. For example, when a transition for transmitting and receiving a certain packet p is considered, the transition for transmitting the packet p always occurs before the transition for receiving the packet p. As described above, an order relation between the transitions that is always satisfied because of the causality in terms of the model is the happens-before relation.

With the DPOR-DS, even when not only the dependency but also presence and absence of the happens-before relation are analyzed with regard to the transition on the execution path, and the dependency exists between certain transitions, no backtrack location is generated in a case where the happens-before relation is satisfied. The characteristic of the DPOR-DS is that, with these procedures, even in the model checking of the distributed-environment-model, the search can be pruned in the same manner as in the DPOR.

CITATION LIST

Non Patent Literature

[NPL 1] Canini, M. et al.: "A NICE Way to Test OpenFlow Applications", Proc. of NSDI, 2012.

[NPL 2] McKeown, N. et al.: "OpenFlow: enabling innovation in campus networks", ACM SIGCOMM Computer Communication Review, Vol. 38, No. 2, pp. 69-74, 2008.

[NPL 3] "OpenFlow Switch Specification Version 1.0.0 (Wire Protocol 0x01)", 2009. http://www.openflow.org/documents/openflow-spec-v1.0.0.pdf

[NPL 4] Flanagan, C. et al.: "Dynamic partial-order reduction for model checking software", Proc. of POPL '05, pp. 110-121, 2005.

[NPL 5] Yang, Y. et al.: "Efficient Stateful Dynamic Partial Order Reduction", Proc. of SPIN '08, pp. 288-305, 2008.

[NPL 6] Yabandeh, M. et al.: "DPOR-DS: Dynamic Partial Order Reduction in Distributed Systems", EPFL Technical Report NSL-REPORT-2009-005, 2009.

SUMMARY OF INVENTION

Technical Problem

A problem related to conventional techniques including NPLs 4, 5, 6 is that, when DPOR is applied in model checking of a distributed-environment-model, search cannot be terminated after a searched state, and this reduces the efficiency of the search.

DPOR-DS described in NPL 6 is a DPOR that can be applied to the model checking of the distributed environments, but the search cannot be terminated after the searched state because of the same reason as that of the DPOR described in NPL 4.

The SDPOR of NPL 5 is a DPOR that can terminate the search after the searched state. However, like the DPOR of NPL 4, the target of the model checking is assumed to be a multi-thread environment model. In order to apply the DPOR to the distributed-environment-model, the analysis of the happens-before relation is required as is done in the DPOR-DS. However, in the analysis, information indicating the order of transitions in each of multiple paths performed in the search is required. However, because, in the graph managed in the SDPOR in order to terminate the search after the searched state, the order in which the transitions are performed in the search in the past is saved without distinguishing each path, necessary information cannot be obtained, and the happens-before relation cannot be analyzed. Hereinafter, this will be explained with reference to FIG. 15 and FIG. 16.

For example, with the SDPOR, in a case where the search is performed in the path making transitions between the states in the order as illustrated in the graph in the upper side of FIG. 15, the graph as illustrated at the lower side of FIG. 15 is generated as a graph illustrating transitions performed in the search in the past. According to the graph at the upper side of FIG. 15, it is understood that a movement is made from the state S0 to the state S1 with the transition t0, thereafter a movement is made to the state S2 with the transition t1, and thereafter, a movement is made to the state S3 with the transition t2. The order of transitions performed in this path is t0→t1→t2. The graph illustrating the order of transitions is illustrated in the lower side of FIG. 15. In the graph, three nodes associated with the transitions from t0 to t2 are displayed, and in order to illustrate the order of transitions, directed edges are drawn between nodes.

Here, it is assumed that there is dependency between the transitions t1 and t2 in the path as illustrated in FIG. 15. In this case, as illustrated at the upper side of FIG. 16, the state S1 is adopted as the backtrack location, and the state search is newly performed from this location. According to the graph as illustrated at the upper side of FIG. 16, it is understood that a new state search is performed in a path of state S1→state S4→state S3. With the SDPOR, in this case, a graph as illustrated at the lower side of FIG. 16 is generated as a graph illustrating transitions performed in the search in the past. The graph as illustrated at the lower side of FIG. 16 is obtained by adding new information to the graph as illustrated at the lower side of FIG. 15. More specifically, in order to indicate that the transition t2 is performed after the transition t0 and the transition t1 is performed after the transition t2, a directed edge from t0 to t2 and a directed edge from t2 to t1 are newly added.

As described above, in the graph managed by the SDPOR, a single node is associated with a single transition, and an anteroposterior relation of transitions performed in a search in the past is indicated by a directed edge. In the case of the graph, an order of transitions in each of multiple paths performed in the past cannot be recognized. Therefore, with the SDPOR, the happens-before relation cannot be analyzed.

As described above, the SDPOR cannot be simply applied to the model checking of the distributed-environment-model. As a result, a conventional technique has a problem in that, when the DPOR is applied to the model checking of the distributed-environment-model, a search after a searched state cannot be terminated, and the search is not efficient.

It is an object of the present invention is to solve the above problems, and to provide a technique allowing efficient search by providing means for terminating a search after a searched state when the DPOR is applied to model checking of a distributed-environment-model.

Solution to Problem

According to the present invention, a model checking device for a distributed-environment-model is provided. The model checking device for a distributed-environment-model, includes:

a distributed-environment-model search unit that adopts a first state as start point when obtaining information indicating a distributed-environment-model which can attain multiple states and move between the states with a predetermined transition achieved by execution of a predetermined operation capable of being executed in each of the states, searches the state that can be attained by the distributed-environment-model by executing a plurality of straight line movements for moving from the first state to a second state which is an end position in a straight line without branching at one or more transitions, and determines whether or not the searched state satisfies a predetermined property;

a searched state management unit that stores the searched state searched in the past;

a searched-transition-history management unit that stores an order of the transitions in each of the straight line movements executed in the past;

a searched state transition association information management unit that stores the transition when moving to another state in the search in the past in such a manner that the transition is associated with each of the searched states; and a distributed-environment-model dependency analysis unit that, when the distributed-environment-model search unit finishes a single straight line movement, analyzing a dependency and a happens-before relation of the plurality of transitions executed in a predetermined order in the straight line movement, and generates a backtrack location indicating a location to which a backtrack is performed in a path of the straight line movement, and, after the distributed-environment-model search unit finishes the search of a single straight line movement, starts another straight line movement with adapting the backtrack location as a start point.

According the present invention, a program is provided. The computer readable non-transitory medium embodying a program, the program causing a computer to perform a method, the method includes:

adapting a first state as start point when obtaining information indicating a distributed-environment-model which can attain multiple states and move between the states with a predetermined transition achieved by execution of a predetermined operation capable of being executed in each of the states, searching the state that can be attained by the distributed-environment-model by executing a plurality of straight line movements for moving from the first state to a second state which is an end position in a straight line without branching at one or more transitions, and determining whether or not the searched state satisfies a predetermined property;

storing the searched state searched in the past;

storing an order of the transitions in each of the straight line movements executed in the past;

storing the transition when moving to another state in the search in the past in such a manner that the transition is associated with each of the searched states; and when finish of a single straight line movement, analyzing a dependency and a happens-before relation of the plurality of transitions executed in a predetermined order in the straight line movement, and generating a backtrack location indicating a location to which a backtrack is performed in a path of the straight line movement, and, after finish of the search of a single straight line movement, starting another straight line movement with adapting the backtrack location as a start point.

According to the present invention, a model checking method for a distributed-environment-model is provided. The model checking method for a distributed-environment-model comprising:

adapting a first state as start point when obtaining information indicating a distributed-environment-model which can attain multiple states and move between the states with a predetermined transition achieved by execution of a predetermined operation capable of being executed in each of the states, searching the state that can be attained by the distributed-environment-model by executing a plurality of straight line movements for moving from the first state to a second state which is an end position in a straight line without branching at one or more transitions, and determining whether or not the searched state satisfies a predetermined property;

storing the searched state searched in the past;

storing an order of the transitions in each of the straight line movements executed in the past;

storing the transition when moving to another state in the search in the past in such a manner that the transition is associated with each of the searched states; and, when finish of a single straight line movement, analyzing a dependency and a happens-before relation of the plurality of transitions executed in a predetermined order in the straight line movement, and generating a backtrack location indicating a location to which a backtrack is performed in a path of the straight line movement, and, after finish of the search of a single straight line movement is finished, thereafter, another straight line movement is started with adapting the backtrack location as a start point.

Advantageous Effects of Invention

According to the present invention, when the DPOR is applied to model checking of a distributed-environment-model, means for terminating a search after a searched state can be realized. As a result, efficient search can be performed.

BRIEF DESCRIPTION OF DRAWINGS

The above objects, and other objects, features, and advantages are clarified from the preferred exemplary embodiments described below and the following drawings attached thereto.

FIG. 12 is a conceptual diagram for explaining an operation of the first exemplary embodiment of the present invention.

FIG. 15 is a schematic diagram for explaining problems associated with a comparative example.

FIG. 16 is a figure for explaining problems associated with the comparative example.

DESCRIPTION OF EMBODIMENTS

Figure 1:
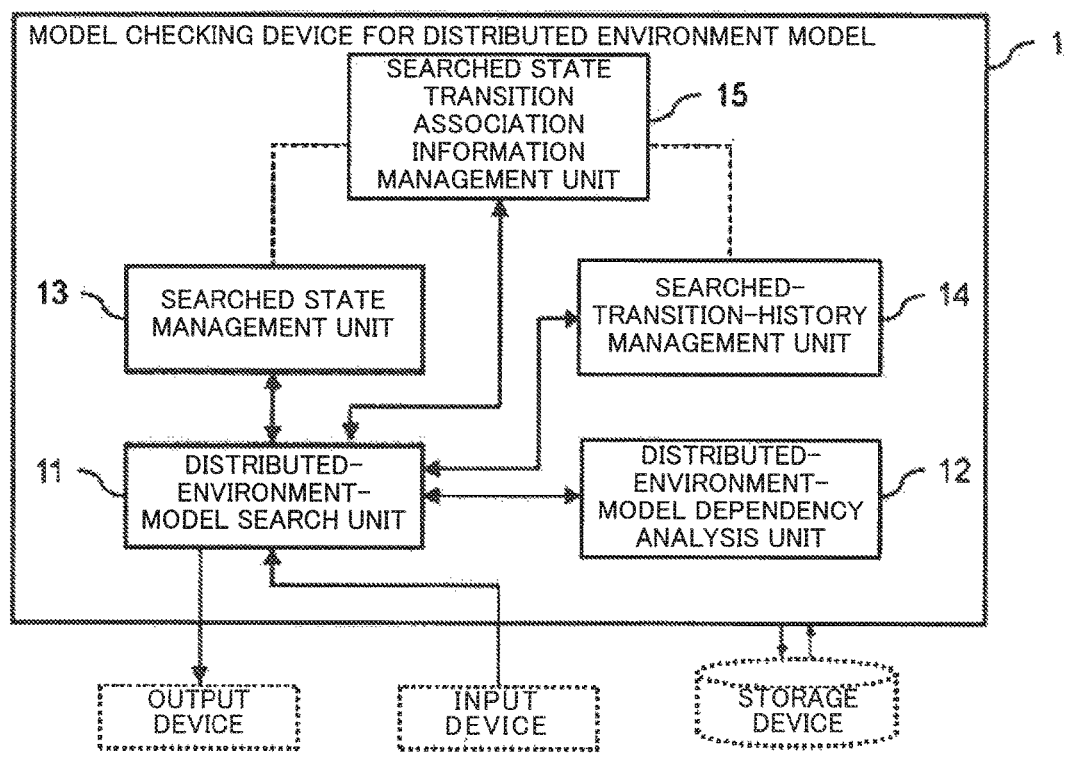
FIG. 1 is a functional block diagram illustrating a configuration of a model checking device for a distributed-environment-model according to a first exemplary embodiment of the present invention.

Hereinafter, exemplary embodiments of the present invention will be explained with reference to drawings. The same constituent elements will be denoted with the same reference numerals, and explanation thereabout is omitted as necessary.

A device according to the present exemplary embodiment is achieved by a combination of arbitrary hardware and software of an arbitrary computer. The combination is mainly composed of a CPU (Central Processing Unit), a memory, a program loaded to the memory (the program includes not only a program stored in the memory in advance when the device is shipped but also a program on a storage medium such as a CD (Compact Disc) or downloaded from such as a server on the Internet), a storage unit such as a hard disk storing the program, and a network connection interface. A person skilled in the art would understand that the methods and the devices for achieving the above may include various modifications.

Functional block diagrams used for the explanation about the exemplary embodiment below do not indicate configurations of hardware units, and instead indicate blocks of functional units. In these drawings, each device is described as being achieved with a single device, but the means for achieving this is not limited thereto. Namely, each device may be a physically divided configuration, or may be a logically divided configuration.

<First Exemplary Embodiment>

[Configuration]

First, a configuration of a first exemplary embodiment of the present invention will be explained in detail with reference to drawings.

Referring FIG. 1, a model checking device 1 for a distributed-environment-model according to the first exemplary embodiment of the present invention includes a distributed-environment-model search unit 11, a distributed-environment-model dependency analysis unit 12, a searched state management unit 13, a searched-transition-history management unit 14, and a searched state transition association information management unit 15.

The distributed-environment-model search unit 11 is configured to exchange information with each of the distributed-environment-model dependency analysis unit 12, the searched state management unit 13, the searched-transition-history management unit 14, and the searched state transition association information management unit 15. In order to associate a searched state managed by the searched state management unit 13 with a transition managed by the searched-transition-history management unit 14, the searched state transition association information management unit 15 manages the association relation thereof. Hereinafter, each unit will be explained.

When the distributed-environment-model search unit 11 obtains information indicating a distributed-environment-model being capable of attaining multiple states and making transition between states at a predetermined transition achieved by execution of a predetermined operation that can be executed in each state, the distributed-environment-model search unit 11 adopts a first state as a start point. The distributed-environment-model search unit 11 searches the state that can be attained by the distributed-environment-model by executing a plurality of straight line movements for moving from the first state to a second state which is an end position in a straight line without branching at one or more transitions (state movement on a straight line path without branching). The distributed-environment-model search unit 11 determines whether or not the searched state satisfies a predetermined property. Then, when the distributed-environment-model search unit 11 finishes the search of a single straight line movement, the distributed-environment-model search unit 11 thereafter starts another straight line movement with a backtrack location being a start point.

For example, the distributed-environment-model search unit 11 receives, via an input device from the user, verification information D11 including a distributed-environment-model and a property that should be satisfied by the distributed-environment-model. Then, the distributed-environment-model search unit 11 uses the received verification information D11 to execute the model checking. Then, the distributed-environment-model search unit 11 returns, to the user via an output device, a verification result D14 including success or failure of satisfaction of the property and a counter example indicating that in a case where the property is not satisfied. The specification of the distributed-environment-model may be any state transition system as long as it is a state transition system capable of appropriately defining the dependency and the happens-before relation explained later and allowing them to be analyzed in computer processing. The description format of the distributed-environment-model may be any format as long as it can be processed by a computer. In the first exemplary embodiment, the specification of the distributed-environment-model is explained as one which will be as described below.

The definition of the state according to the distributed-environment-model of the first exemplary embodiment will be explained. The state is defined as a group including three items, i.e., (N, M, Q), as elements. N is a set of nodes (hereinafter an operation subject nodes) which are operation subjects in distributed environments, and an element n in N (n∈N) has a variable sw representing that state. M is a set of messages exchanged between the operation subject nodes, and an element m in M (m∈M) has a variable my representing a content of the message. Q is a set of communication channels, and an element q in Q (q∈Q) is a communication channel achieved by a variable storing multiple messages.

It is assumed that the operation subject node can retrieve a message from the communication channel in arbitrary order irrelevant to the order in which the messages are stored in the communication channel. Each operation subject node has communication channels for communicating with other operation subject nodes, the communication channels being provided for transmission and reception, respectively, for each operation subject node capable of communicating with each other. A transmission communication channel for one certain operation subject node is a reception communication channel for any of the other operation subject nodes, and vice versa.

The definition of the transition of the distributed-environment-model according to the first exemplary embodiment will be explained. It is assumed that the transition indicates that how the state of the model is changed (moved) when any one of the operation subject nodes existing in the distributed-environment-model executes an operation of a particular unit. More specifically, the operation of the particular unit includes three types as follows.

1. Message transmission by the operation subject node
2. Message reception by the operation subject node
3. Internal operation by the operation subject node Hereinafter, the above three types of operations will be explained in detail.

The message transmission with the operation subject node will be explained. The operation subject node can execute message transmission operation in accordance with the state sv of itself. In the operation, the operation subject node n generates a single message m, stores the message m in the message transmission communication channel of the operation subject node n (=reception communication channel for certain operation subject node other than the operation subject node n), and changes the content of the state sv of itself (in some cases, the content may not be changed).

The message reception with the operation subject node will be explained. In a case where one or more messages are stored in the message reception communication channel of itself, the operation subject node can execute the message reception operation. In the operation, the operation subject node n retrieves an arbitrary message m from the own message reception communication channel q storing one or more messages. Then, the operation subject node n changes the content of the state sv of itself in accordance with the content my of the message m (in some cases, the content may not be changed).

The internal operation of the operation subject node will be explained. The operation subject node can execute the internal operation in accordance with the state sv of itself. The operation subject node n executing the internal operation changes the content of the state sv of itself (in some cases, the content may not be changed).

When the state is changed, the distributed-environment-model search unit 11 not only performs the operation of the model but also confirms success or failure of the property included in the verification information D11 in the state after the change. In a case where the property is not satisfied, the distributed-environment-model search unit 11 returns, back to the user via the output device, the verification result D14 including a result indicating that the property is not satisfied and a counter example which is a specific example indicating that. In the verification information D11, the property is not necessarily included. In a case where the property is not defined, a typical property is verified, and thereafter, the entire model checking device 1 for the distributed-environment-model can operate as if the verification information D11 includes the typical property.

When the distributed-environment-model search unit 11 finishes a single straight line movement (state movement according to a straight line path not including any branch), the distributed-environment-model dependency analysis unit 12 analyzes the dependency and the happens-before relation for multiple transitions executed in a predetermined order in the straight line movement. Then, the distributed-environment-model dependency analysis unit 12 generates a backtrack location indicating a location where the backtrack is to be performed on the path of the straight line movement (straight line path) as necessary. In a case where the distributed-environment-model search unit 11 searches the distributed-environment-model representing the OpenFlow network environment, the distributed-environment-model dependency analysis unit 12 can analyze the dependency and the happens-before relation in the OpenFlow network environment.

For example, the distributed-environment-model dependency analysis unit 12 receives, from the distributed-environment-model search unit 11, an execution path information D12 indicating a content of a path in which the search is actually executed (execution path). The execution path information D12 includes at least the first half portion execution path. The execution path information D12 may further include one or more latter half portion execution paths connected to the rear of the first half portion execution path. The distributed-environment-model dependency analysis unit 12 analyzes the dependency and the happens-before relation between two transitions on the execution path by using the received execution path information D12.

For example, in a case where the execution path information D12 does not include the latter half portion execution path, the distributed-environment-model dependency analysis unit 12 analyzes the dependency and the happens-before relation between the transitions on the first half portion execution path included in the execution path information D12. On the other hand, in a case where the execution path information D12 includes the latter half portion execution path, the distributed-environment-model dependency analysis unit 12 analyzes the dependency and the happens-before relation between two transitions on the execution path by connecting the first half portion execution path included in the execution path information D12 and a single latter half portion execution path in this order.

In a case where the execution path information D12 includes multiple latter half portion execution paths, the distributed-environment-model dependency analysis unit 12 analyzes the dependency and the happens-before relation between two transitions of each of multiple execution paths by connecting the first half portion execution path and each of the multiple latter half portion execution paths in this order. Then, the distributed-environment-model dependency analysis unit 12 generates a backtrack location on the first half portion execution path based on the analysis result, and returns the result (first half portion execution path in which the backtrack location is generated) D13 to the distributed-environment-model search unit 11.

The dependency is a relation that is consisted between two transitions. Intuitively, in a case where the execution order of these two transitions is changed (inversed), the result after these transitions in the state transition system changes, or in a case where one of the transitions is performed, the other of the transitions can be performed or cannot be performed, then, this may be said that the dependency is consisted (there is dependency) between these two transitions. A condition that the dependency is "not consisted" between the transitions t1 and t2 is generally defined as follows.

1. "In a case where the transition t1 can be executed in the state s1 (the state of the model), and the transition t1 changes the state s1 to the state s2, the transition t2 can be executed in both of the states s1 and s2 or cannot be executed in both of the states s1 and s2."

2. "In a case where the transitions t1 and t2 can be executed in the state s1, and if a state executed the transition t2 in a state executed the transition t1 from the state s1 is s2, a state executed the transition t1 in a state executed the transition t2 from the state s1 is also s2."

The distributed-environment-model dependency analysis unit 12 may analyze success or failure of the above-mentioned general dependency. However, since the cost for analyzing success or failure of the above-mentioned generally dependency is high, in the first exemplary embodiment, by considering a specification of a distributed-environment-model used here and an algorithm of DPOR, in a case where the following conditions are satisfied, it is defined that there is a dependency.

"An operation subject node operating in the transition t1 and an operation subject node operating in the transition t2 are the same operation subject node, and in any of transitions, a content of a state sv in the operation subject node is changed."

The happens-before relation is an execution order relation between transitions that is always consisted in a certain model. For example, when considering a transition for performing transmitting and receiving a certain message m in a distributed-environment-model according to the first exemplary embodiment, the transition t1 caused by the transmission of the message m always occurs before the transition t2 caused by the reception of the message m. As described above, the execution order relation between transitions that is always consisted from the relation between an effect and its cause of model is the happens-before relation, and is described as t1→t2. In the first exemplary embodiment, the happens-before relation is defined as follows in view of the specification of the distributed-environment-model used here and the algorithm of the DPOR.

1. "In a case where the transition t1 is a transition caused by a message transmission by the operation subject node, the transition t2 is a transition caused by a message reception by the operation subject node, and the message transmitted in the transition t1 and the message received in the transition t2 are the same message, this is described as t1→t2."

2. "In a case that is t1→t2 and t2→t3, this is described as t1→t3."

A data structure of the execution path information D12 will be explained. The first half portion execution path included in the execution path information D12 is an array of a group including four elements, i.e., (st, tr, Backtrack, Done) (or a data structure equivalent thereto).

The element "st" is a state of a distributed-environment-model at a certain time point. The element "tr" is a transition performed from the state st. The element "Backtrack" is a set of transitions. This set is a set of transitions which are to be executed from the state st (the state of the same group) when a backtrack is performed in a search in model checking. The element "Done" is a set of transitions. This set is a set of transitions that has been executed in the past from the state st (the state of the same group) in a search. The transitions included in the element "Backtrack" of certain group but not included in the element "Done" of that group are transitions which should be executed by performing backtrack from the state st of the group but have not yet been executed.

The latter half portion execution path included in the execution path information D12 is an array of transitions (or a data structure equivalent thereto). When a transition is represented as "a transition of an execution path element", the transition represents tr when it is an element of the first half portion execution path, and the transition represents the element itself (=transition) when it is an element of the latter half portion execution path. The first half portion execution path included in certain execution path information D12 need to be one. However, the latter half portion execution path may be one, multiple, or nothing.

The data structure of the transition will be explained. The transition is a group having five elements, i.e., (node, type, send, recv, change_flag).

The element "node" is an operation subject node that performs an operation causing the transition. The element "type" is a type (a value indicating message transmission, message reception, internal operation, and the like) of operation causing the transition. The element "send" is information for identifying a message transmitted in an operation "message transmission" causing the transition. The element "recv" is information for identifying a message received in an operation "message reception" causing the transition. The element "change_flag" is a flag indicating whether or not the state sv of the operation subject node performing an operation causing the transition is changed. The element "change_flag" stores true when the state sv is changed, and stores false when the state sv was not changed. The transition data based on this data structure is generated upon appropriately setting the value of each field in accordance with the content of the transition when the state of the distributed-environment-model performs the transition in the search performed by the distributed-environment-model search unit 11.

The searched state management unit 13 stores the searched state searched in the past. For example, the searched state management unit 13 receives, from the distributed-environment-model search unit 11, (information indicating) the state of the distributed-environment-model performed the search, and saves the state. The saving method may be a method for saving (information indicating) the received state as it is, or may be a method for saving information obtained by applying any given conversion (for example, compressing the information in order to reduce the storage capacity). When the searched state management unit 13 receives, from the distributed-environment-model search unit 11, an inquiry as to whether or not the state of certain distributed-environment-model has been searched in the past, the searched state management unit 13 searches to find if anyone that matches the state exists in the saved states. Then, when the matching state exists, the searched state management unit 13 returns "searched" to the distributed-environment-model search unit 11, and when the matching state does not exist, the searched state management unit 13 returns "not yet searched" to the distributed-environment-model search unit 11.

The searched-transition-history management unit 14 stores an order of transitions in each of the straight line movements (state movements in the straight line path not including any branch) executed in the past. For example, the searched-transition-history management unit 14 receives, from the distributed-environment-model search unit 11, (information indicating) a transition performed the search, and saves it by using the graph structure explained below. The graph is expressed with a node and a directed edge connecting nodes. The graph includes a root node indicating a start point of a path and multiple transition nodes respectively indicating multiple transitions performed in the search. The directed edge expresses an execution order of transitions on a particular path in the distributed-environment-model. The first transition expressed by a transition node to which a directed edge is drawn from the root node is the transition that is performed first from the initial state of the distributed-environment-model. The second transition expressed by another transition node to which a directed edge is drawn from the transition node is a transition that is performed subsequently to the first transition.

In the SDPOR, with regard to the transition tr performed in paths different from each other, there is always a single transition node indicating the transition tr in the managed graph (the transition and the node in the graph satisfy a one-to-one relation). In contrast, in a case where the transition tr is executed in paths different from each other (straight line path) in the graph managed by the searched-transition-history management unit 14, the searched-transition-history management unit 14 manages them by associating them with different nodes.

In the present exemplary embodiment, by using such graph structure, the order of transitions in any straight line path performed in the past can be found based on tracking a directed edge from the root node. This is the difference between the present exemplary embodiment and the SDPOR. The graph is empty at the start point of the search with the distributed-environment-model search unit 11. The graph is structured by receiving an instruction, from the distributed-environment-model search unit 11, for generating new nodes (the root node and the transition node) and directed edges.

The searched state transition association information management unit 15 associates the transition at the time of movement to another state in a search in the past with each of the searched states, and stores the transition. For example, the searched state transition association information management unit 15 saves information for associating the state of the distributed-environment-model searched in the past by the distributed-environment-model search unit 11 with the transition performed from the state. When given certain state of the distributed-environment-model, from the distributed-environment-model search unit 11, as an input, and receiving the inquiry of the transition performed in the search in the past from that state, the searched state transition association information management unit 15 identifies the transition performed from that state by using the information managed by the searched-transition-history management unit 14, and returns the identified result. In a case where there are multiple transitions performed from that state, the searched state transition association information management unit 15 returns all the information indicating these transitions. When given a certain state and certain transition of the distributed-environment-model, from the distributed-environment-model search unit 11, as an input, and receiving an instruction for associating them, the searched state transition association information management unit 15 associates the state with the node indicating the transition saved in the searched-transition-history management unit 14.

[Operation]

Subsequently, an operation of the first exemplary embodiment will be explained in detail.

First, the overall flow will be explained with reference to FIG. 2. The user prepares the verification information D11, and inputs it into the distributed-environment-model search unit 11 via an input device (step S11 of FIG. 2).

When receiving the verification information D11, the distributed-environment-model search unit 11 performs a search in an appropriate path (straight line path) by making state transition in the distributed-environment-model included in the verification information D11. Then, the distributed-environment-model search unit 11 generates the execution path information D12 indicating the executed path, and transmits it to the distributed-environment-model dependency analysis unit 12 (step S12). The distributed-environment-model dependency analysis unit 12 analyzes the dependency and the happens-before relation in the execution path by using the execution path information D12, generates a backtrack location in the first half portion execution path as necessary, and returns the result (the first half portion execution path D13 generated the backtrack location) to the distributed-environment-model search unit 11 (step S13).

In a case where a backtrack location where a backtrack is not performed is included in the first half portion execution path D13 (Yes in step S15), the distributed-environment-model search unit 11 performs a state transition in the distributed-environment-model again from a predetermined backtrack location (for example: the deepest backtrack location in the first half portion execution path D13), obtains new execution path information D12', and transmits it to the distributed-environment-model dependency analysis unit 12 (step S14). The distributed-environment-model dependency analysis unit 12 analyzes the dependency and the happens-before relation in the execution path by using the execution path information D12', and performs the same processing (step S13). In a case where a backtrack location where a backtrack is not performed is included in the first half portion execution path D13 (Yes in step S15), the above processing is repeated.

Thereafter, the distributed-environment-model search unit 11 outputs the verification result D14 including success or failure of the property in the state after each transition and the counter example indicating that in a case where the property is not satisfied (step S16). Then, the user confirms the verification result D14 output in step S16 (step S17).

The timing for determining success or failure of the property in each of the states (searched state) after the transition may be illustrated, for example, by the following examples. For example, the distributed-environment-model search unit 11 can determine success or failure of the property in the state after the transition at every time of the state transition in the processing for performing a search in a path (straight line path) by performing a state transition in the distributed-environment-model in step S12 and the processing for performing a search in another path (straight line path) from the predetermined backtrack location in step S14. Alternatively, after No in step S15, the distributed-environment-model search unit 11 can collectively determine success or failure of the property in the state (searched state) after each transition performed until then.

Figure 2:
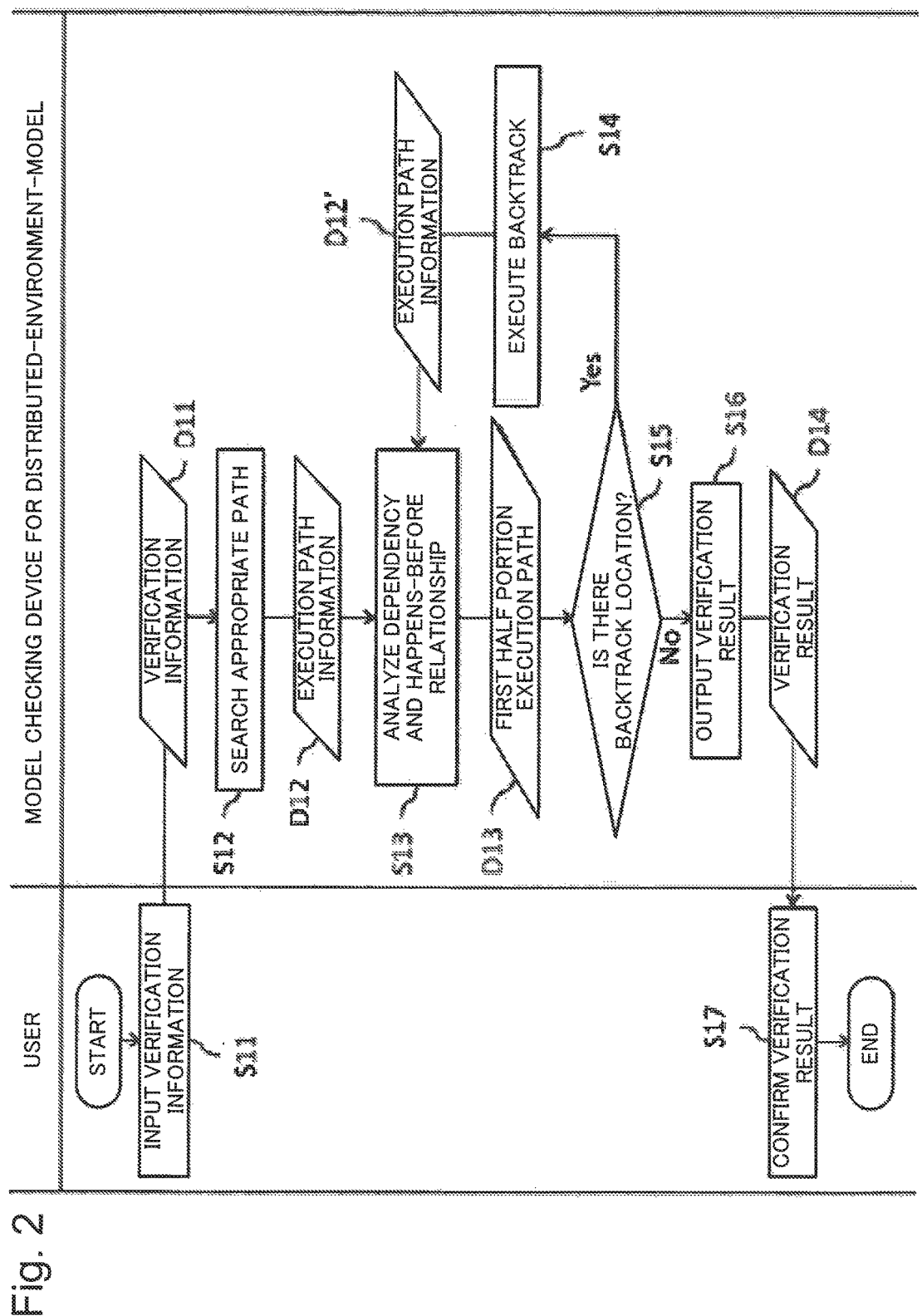
FIG. 2 is a flow diagram illustrating an operation of the first exemplary embodiment of the present invention.

Although not illustrated in FIG. 2, in a case of processing for determining success or failure of property in the state after the transition at every time of the state transition, when finding a state which does not satisfy the property, the distributed-environment-model search unit 11 may terminate the processing of the model checking at that point, and may output the verification result D14.

As illustrated in FIG. 2, in a case where a configuration is made to output a verification result after all the state transitions are performed, the distributed-environment-model search unit 11 can find all the states not satisfying the property existing in the distributed-environment-model, and can output the result as the verification result D14.

Subsequently, each step will be explained in detail with reference to FIG. 3 to FIG. 9 and FIG. 11 to FIG. 14. First, FIG. 11 to FIG. 14 will be explained. In FIG. 11 to FIG. 14, "situation of state transition" indicates a situation (fact) of transition between states that is actually performed in a search of the state st of the distributed-environment-model. "Transition", "transition history", "first half portion execution path", and "latter half portion execution path" schematically illustrate data processed by the model checking device for a distributed-environment-model according to the present exemplary embodiment when searching the state st of the distributed-environment-model. Each of multiple transition elements Tr0 to Tr5 indicated in "transition" illustrates each transition that can be executed and identified with the verification information D11. In the drawings, by associating an arrow between states st in "situation of state transition" with a transition element, a content of transition performed in each of the movements between the states st is illustrated. "Transition history" indicates a graph of the transition history managed by the searched-transition-history management unit 14. "First half portion execution path" and "latter half portion execution path" indicate the execution path information D12 generated by the distributed-environment-model search unit 11 and the like.

Figure 11:
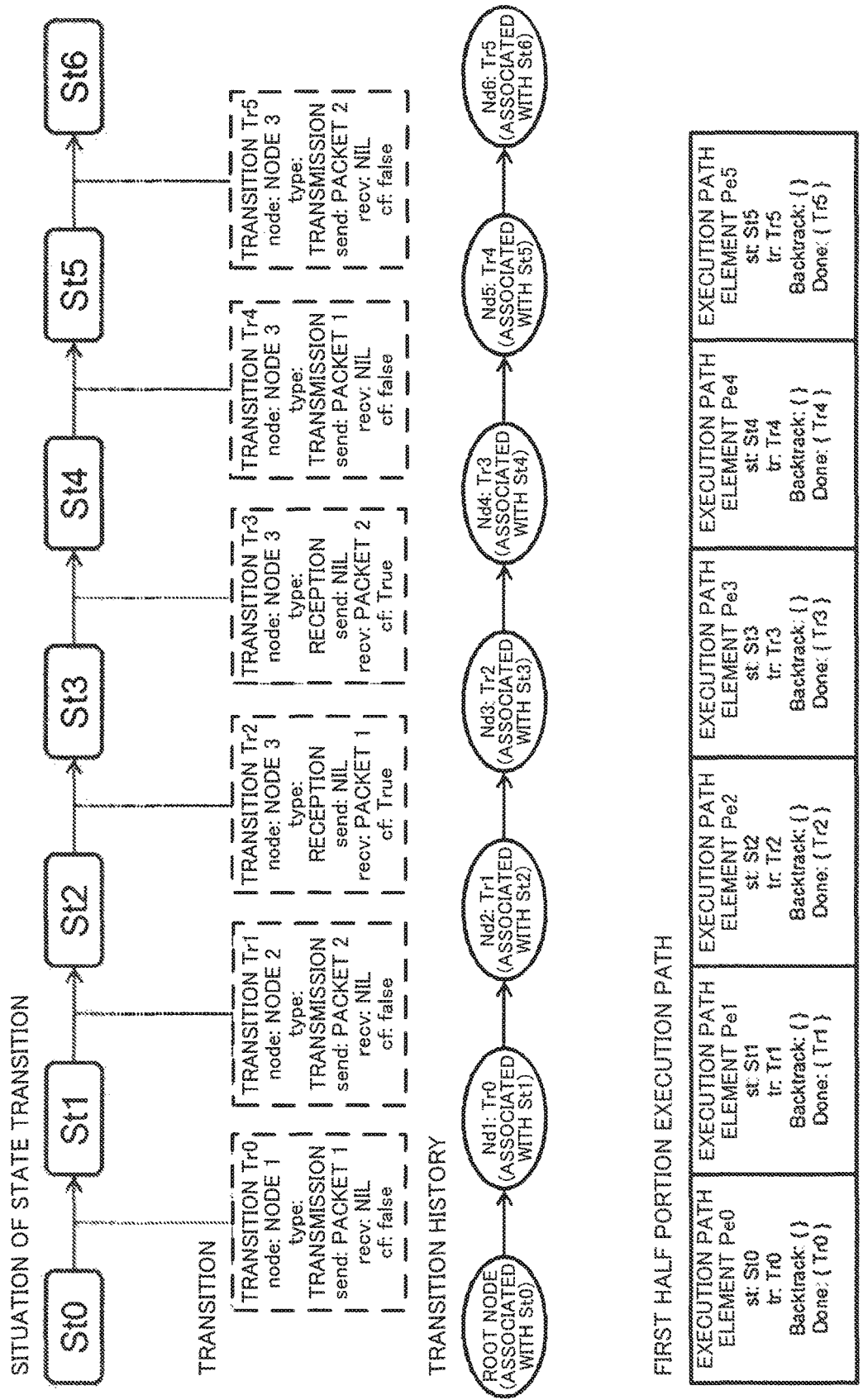
FIG. 11 is a conceptual diagram for explaining an operation of the first exemplary embodiment of the present invention.

Referring "transition" in FIG. 11, the contents of each of the transitions Tr0 to Tr5 are illustrated with data of the group having the five elements, i.e., (node, type, send, recv, change_flag). According to the data, for example, it is understood that a transition from the state St0 to the state St1 in an execution path indicated by "situation of state transition" is caused by the transition Tr0, the operation subject node is the node 1, the operation content is a transmission of a message by the operation subject node, the identification information of the transmitted message is the packet 1, and the state of the operation subject node caused by the operation has not been changed.

By referring "situation of state transition" and "transition", it is understood that, in this path, the transitions are performed in the order of Tr0→Tr1→ . . . Tr5. In the graph of "transition history", it is indicated that the transitions are performed in the order. By referring "transition history", it is understood that which state each transition is associated. Further, by referring "first half portion execution path", it is understood that, by confirming the execution path element Pe accumulated in order, the state st transfers in the order of St0→St1→ . . . →St5 in the path, and the transitions tr is performed in the order of Tr0→Tr1→ . . . Tr5. The transition performed from each state st and the backtrack that is to be performed from each state st are understood.

At the start point of step S12 in FIG. 2, the data of "transition history", "first half portion execution path", and "latter half portion execution path" as illustrated in FIG. 11 to FIG. 14 is in empty state. By executing the step S12 and subsequent steps, the data shown in the drawings is generated gradually.

Figure 3:
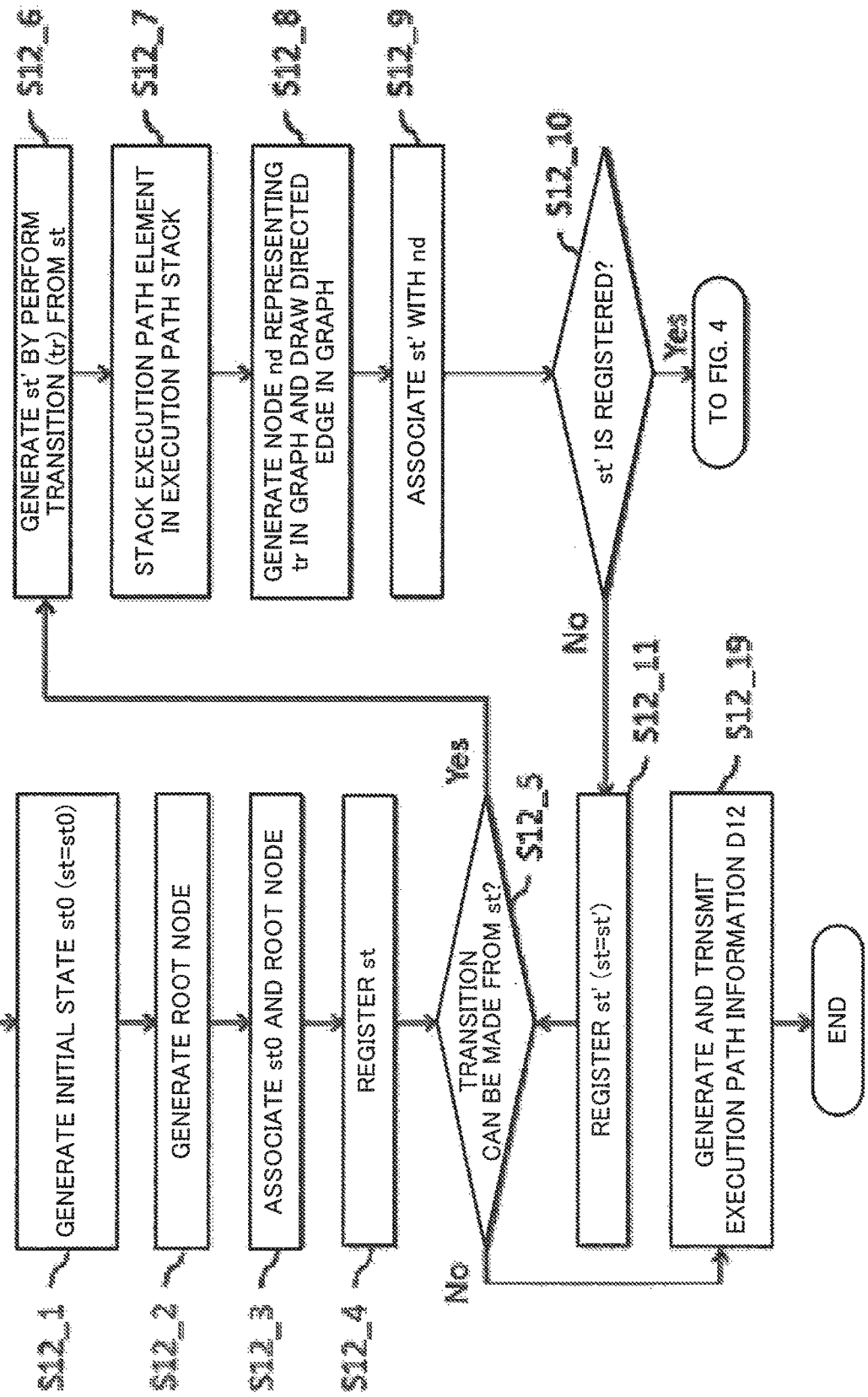
FIG. 3 is a flow diagram illustrating the details of a portion of step S12 in the first exemplary embodiment of the present invention.

First, step S12 will be explained with reference to FIG. 3 and FIG. 11. The distributed-environment-model search unit 11 extracts the distributed-environment-model from the verification information D11, generates the initial state St0 of the distributed-environment-model, and makes the state st st=St0 (step S12_1 in FIG. 3). Next, the distributed-environment-model search unit 11 generates a root node representing the initial state St0 in the graph managed by the searched-transition-history management unit 14 (step S12_2). With this step, the root node in "transition history" illustrated in FIG. 11 is generated. Further, the distributed-environment-model search unit 11 associates the initial state St0 and the root node generated in step S12_2 with the searched state transition association information management unit 15 (step S12_3). In FIG. 11, information indicating which state at each node is associated with is described in each node (root node and transition node) in the graph of the transition history. However, the associating method is not limited thereto.

Next, the distributed-environment-model search unit 11 registers the initial state St0 to the searched state management unit 13 (step S12_4). Next, the distributed-environment-model search unit 11 checks whether there are one or more transitions that can be executed from the initial state St0 by using the verification information D11 (step S12_5). In a case of presence, the distributed-environment-model search unit 11 selects any one of transition tr therefrom, performs the transition tr (transition Tr0 in the case of FIG. 11) from the initial state St0, and generates a state st' after the transition (St1 in the case of FIG. 11) (step S12_6). Further, the distributed-environment-model search unit 11 generates execution path elements (st, tr, Backtrack, Done) and stack them in an execution path stack (step S12_7). With this step, the execution path element Pe0 indicated in the "first half portion execution path" of FIG. 11 is generated. The element "st" included in the execution path element Pe0 indicates a state before the transition (St0 in the case of the example of FIG. 11). The element "tr" indicates a transition executed this time (Tr0 in the case of the example of FIG. 11). The element "Backtrack" indicates a transition of backtrack to be executed (none in the case of the example of FIG. 11). The element "Done" indicates a transition executed this time and in the past from the state before the transition (Tr0 in the case of the example of FIG. 11).

Next, the distributed-environment-model search unit 11 generates the transition node Nd1 indicating the transition tr performed in step S12_5 in the graph managed by the searched-transition-history management unit 14, and draws a directed edge from the root node to the transition node Nd1 (step S12_8). With this step, the transition node Nd1 indicated in "transition history" of FIG. 11 (a transition node indicating the transition Tr0) is generated, and the directed edge from the root node to the transition node Nd1 is drawn.

Next, the distributed-environment-model search unit 11 associates the state st' (St1 in the case of the example of FIG. 11) and the node Nd1 with the searched state transition association information management unit 15 (step S12_9). Further, the distributed-environment-model search unit 11 checks whether or not the state st' (St1 in the case of the example of FIG. 11) has already been registered in the searched state management unit 13 (step S12_10). When not registered, the distributed-environment-model search unit 11 registers the state st' (step S12_11), and returns back to step S12_5 (when returning, the distributed-environment-model search unit 11 makes st st=st' (st=St1 in the case of the example of FIG. 11)).

Thereafter, by repeating the same processing until No in step S12_5 or Yes in step S12_10, the data as illustrated in FIG. 11 is generated.

In a case where No yields in step S12_5 (i.e., in a case where Yes does not yield in step S12_10), the distributed-environment-model search unit 11 generates the execution path information D12 by making the content of the execution path stack at that point (execution path elements Pe0 to Pe5 in the case of FIG. 11) the first half portion execution path, and the latter half portion execution path be empty. The distributed-environment-model search unit 11 transmits it to the distributed-environment-model dependency analysis unit 12 (step S12_19), and terminates step S12.

Figure 4:
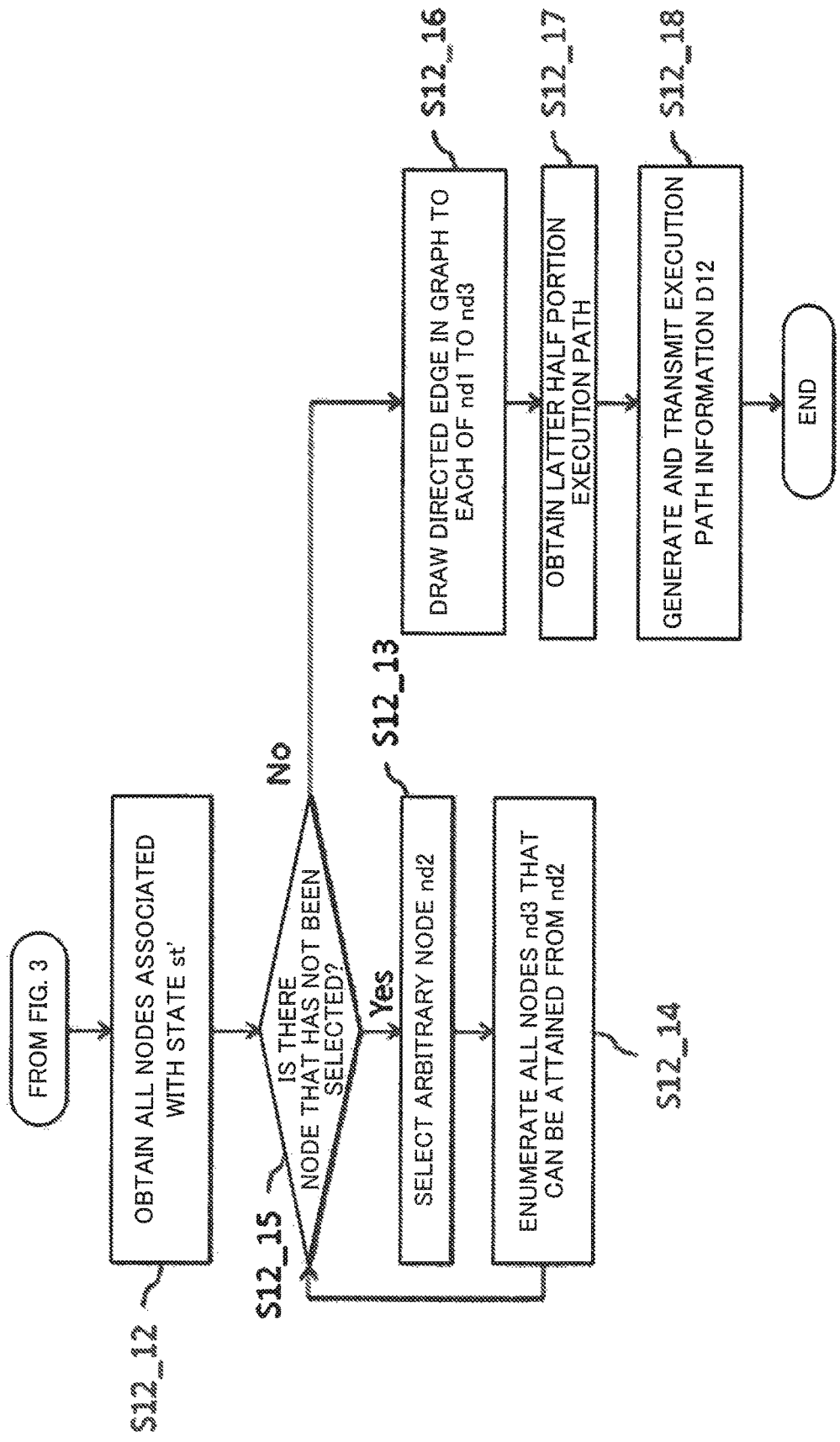
FIG. 4 is a flow diagram illustrating the details of a portion of step S12 in the first exemplary embodiment of the present invention.

Subsequently, the processing after Yes in step S12_10 will be explained with reference to FIG. 4, FIG. 12, and FIG. 13.

In a case where Yes yields in step S12_10, i.e., in a case where the state st' after certain transition is registered in the searched state management unit 13, first, the distributed-environment-model search unit 11 obtains all the transition nodes associated with the state st' in the searched state transition association information management unit 15 (step S12_12).

In the case of the example of FIG. 12, a search is performed in a path St0→St1→St2→St3→St4→St5→St6 in the past, and, at this time, a search is newly performed in a path St2→St7→St4. In this case, the state St7 becomes the state St4 with performing the transition Tr2 in a search in a new path, the state St4 is determined to be registered in the searched state management unit 13 in step S12_10. The "transition history" and the "first half portion execution path" in FIG. 12 indicate the state immediately after the state St7 becomes the state St4 with performing the transition Tr2 and it is determined to be registered in the searched state management unit 13 in step S12_10. In this case, in step S12_12, the distributed-environment-model search unit 11 obtains the transition node Nd4 associated with the state St4 in the searched state transition association information management unit 15. In the case of the example illustrated in the drawings, there is one transition node associated with the state St4 (excluding Nd8). However, in a case where there are multiple transition nodes, the distributed-environment-model search unit 11 obtains all of the multiple transition nodes associated with the state St4.

Next, the distributed-environment-model search unit 11 selects an arbitrary transition node nd2 from among the transition nodes obtained in step S12_12 (step S12_13). The distributed-environment-model search unit 11 enumerates all the transition nodes nd3 that can be attained by tracking only one of the directed edges from the transition node nd2 in the graph managed by the searched-transition-history management unit 14 (step S12_14). The distributed-environment-model search unit 11 repeats steps S12_13 to S12_14 until all the transition nodes are selected in step S12_13 (loop of Yes in step S12_15).

In the example of FIG. 12, the distributed-environment-model search unit 11 obtains the transition node Nd5 that can be attained by tracking only one of the directed edges from the transition node Nd4.

When No yields in step S12_15, the distributed-environment-model search unit 11 proceeds to step S12_16. In step S12_16, the distributed-environment-model search unit 11 draws a directed edge from the transition node representing the transition attaining the state st' determined to be registered in step S12_10 to each of the transition nodes nd3 selected in step S12_14 in the graph managed by the searched-transition-history management unit 14 (step S12_16).

Figure 13:
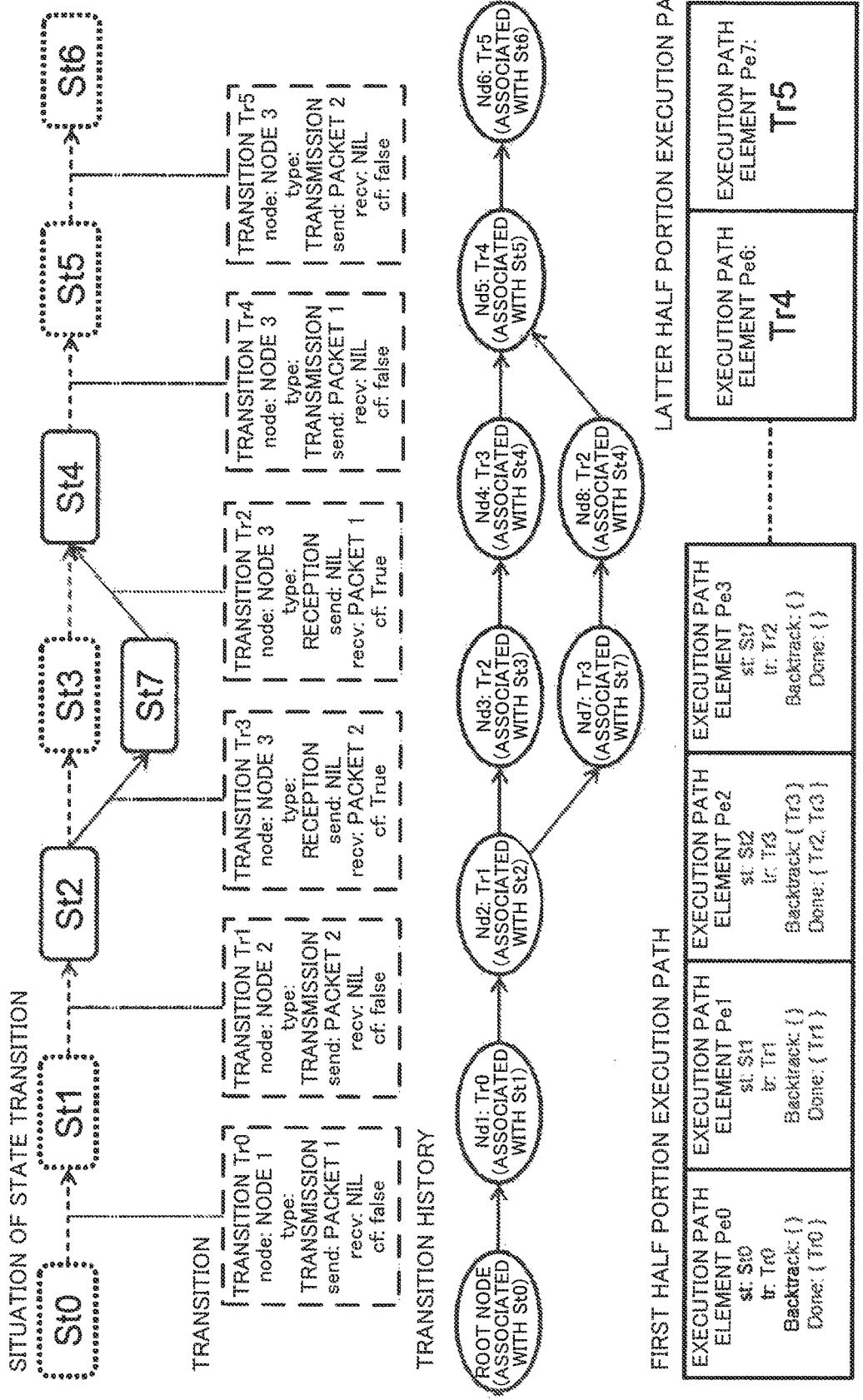
FIG. 13 is a conceptual diagram for explaining an operation of the first exemplary embodiment of the present invention.

In the case of the example of FIG. 12, the distributed-environment-model search unit 11 draws a directed edge from the transition node Nd8 representing the transition (the state St7 from the transition Tr2) attaining the state St4 determined to be registered to the transition node Nd5 selected in step S12_14, and as a result, the state as illustrated in FIG. 13 is attained.

Next, the distributed-environment-model search unit 11 adopts the state st' as the start point state, and obtains one or more latter half portion execution paths (step S12_17). Thereafter, the distributed-environment-model search unit 11 adopts the content of the execution path stack at that point (the execution path until attaining the state st' determined to be registered in step S12_10) as the first half portion execution path, and generates the execution path information D12 by adding one or more latter half portion execution paths obtained in step S12_17 to the first half portion execution path. Then, the distributed-environment-model search unit 11 transmits the execution path information D12 to the distributed-environment-model dependency analysis unit 12 (step S12_18), and terminates step S12.

Figure 5:
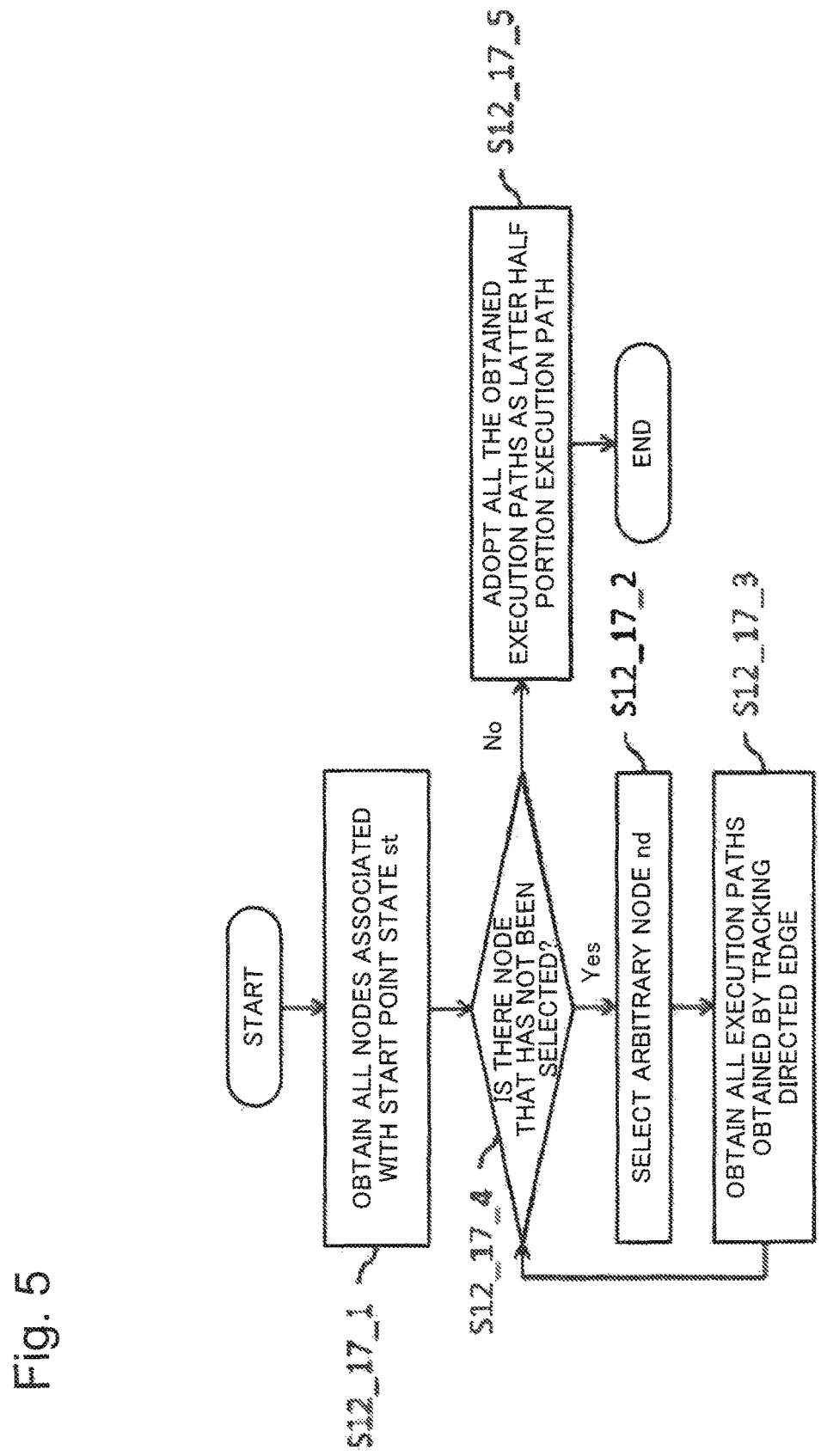
FIG. 5 is a flow diagram illustrating the details of a portion of step S12 in the first exemplary embodiment of the present invention.

Here, step S12_17 will be explained in detail with reference to FIG. 5 and FIG. 13. First, the distributed-environment-model search unit 11 extracts all the transition nodes associated with the start point state st' in the searched state transition association information management unit 15 (step S12_17_1). In the case of the example of FIG. 13, the distributed-environment-model search unit 11 extracts the transition node Nd4 associated with the state St4 which is the start point state st'.

Next, the distributed-environment-model search unit 11 selects an arbitrary transition node nd from the extracted transition nodes (step S12_17_2). The distributed-environment-model search unit 11 obtains the execution path (one of latter half portion execution paths) obtained by tracking the directed edge from the transition node nd to the end of the directed edge (=until attaining the transition node having no directed edge to another transition node) in the graph managed by the searched-transition-history management unit 14 (step S12_17_3). In the case of the example of FIG. 13, the distributed-environment-model search unit 11 obtains the execution path "Tr4→Tr5" obtained by tracking the directed edge from the transition node Nd4 to the end of the directed edge.

In a case where a branch occurs in the middle of step S12_17_2 (=arriving at a transition node having multiple directed edges to other transition nodes), the distributed-environment-model search unit 11 covers all the ways to track the directed edges, and obtains all the execution paths (multiple latter half portion execution paths). The distributed-environment-model search unit 11 repeats step S12_17_2 to S12_17_3 until all the transition nodes extracted in step S12_17_1 are selected (step S12_17_4). The distributed-environment-model search unit 11 adopts all the execution paths obtained in this procedure as the latter half portion execution path (step S12_17_5), and terminates step S12_17. With this processing, the "latter half portion execution path" as illustrated in FIG. 13 is generated.

As described above, for example, every time each state is searched during the N-th (N is an integer equal to or more than one) search of the straight line movement, the distributed-environment-model search unit 11 can confirm whether the state is stored in the searched state management unit 13. In a case where the state is stored, the distributed-environment-model search unit 11 adopts the state as the end position, and terminates the search of the straight line movement. Together with this, the distributed-environment-model search unit 11 can obtain transitions performed after the state which is the end position of the N-th search in the past search (the (N−1)-th or older searches, and the N-th search until then), and one or more executed paths indicating the order thereof by using the information stored in the searched-transition-history management unit 14 and the searched state transition association information management unit 15. Then, the distributed-environment-model dependency analysis unit 12 analyzes the dependency and the happens-before relation on multiple transitions in a predetermined order included in a continuous path obtained by connecting, in the following order, a path of search of the N-th straight line movement and each of one or more executed paths obtained by the distributed-environment-model search unit 11 (the transition performed after the state which is the end position of the N-th search and the executed path indicating the order thereof). Then, the distributedenvironment-model dependency analysis unit 12 can generate the backtrack location in the path of the search of the N-th straight line movement.

Figure 14:
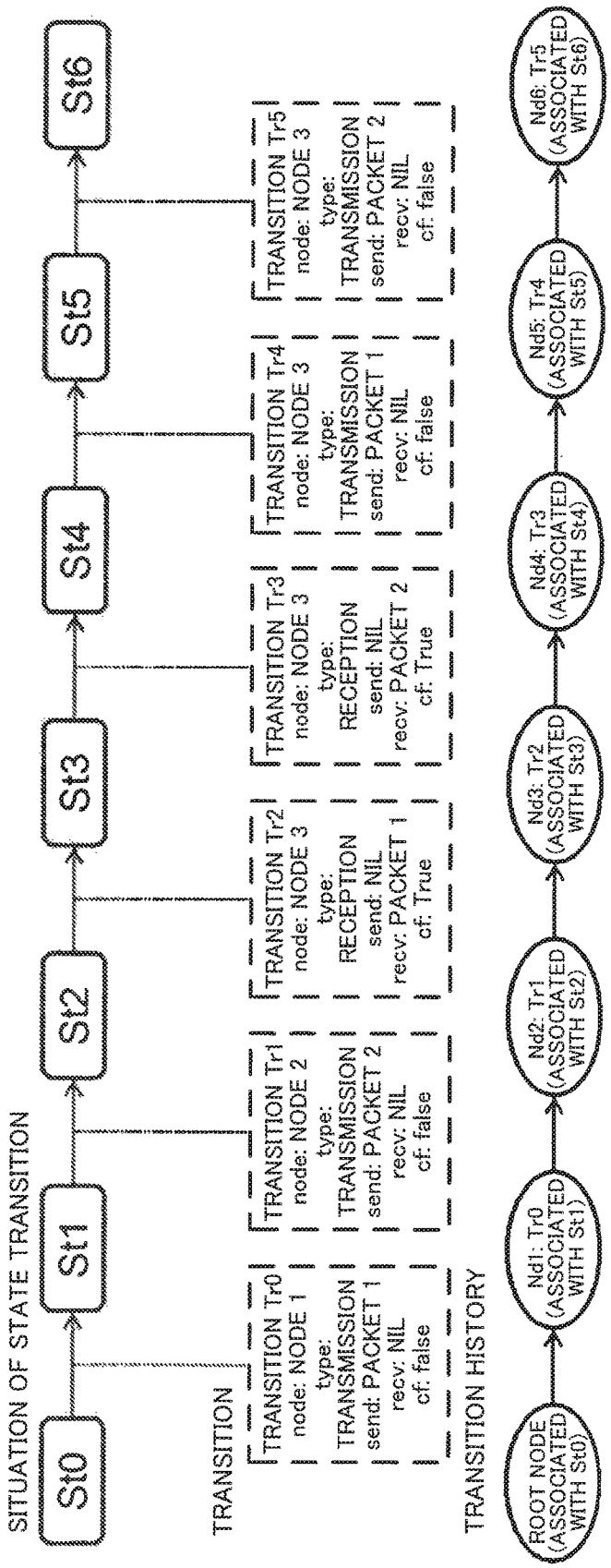
FIG. 14 is a conceptual diagram for explaining an operation of the first exemplary embodiment of the present invention.

Subsequently, step S13 of FIG. 2 will be explained in more detail with reference to FIG. 6 and FIG. 14. First, the distributed-environment-model dependency analysis unit 12 identifies the execution path of the analysis target. In a case where the latter half portion execution path is not included in the execution path information D12, the distributed-environment-model dependency analysis unit 12 adopts the first half portion execution path included in the execution path information D12 as the execution path of the analysis target. In the case of the example of FIG. 14, the first half portion execution path is the execution path of the analysis target.

Thereafter, the distributed-environment-model dependency analysis unit 12 performs pre-processing to analyze the happens-before relation of the execution path of the analysis target (first half portion execution path). Then, when the distributed-environment-model dependency analysis unit 12 identifies a combination of transitions having dependency but not having happens-before relation, the distributed-environment-model dependency analysis unit 12 generates a backtrack location in the execution path (first half portion execution path). Thereafter, the distributed-environment-model dependency analysis unit 12 returns the execution path in which the backtrack location is generated (first half portion execution path D13) to the distributed-environment-model search unit 11, and terminates step S13.

Figure 6:
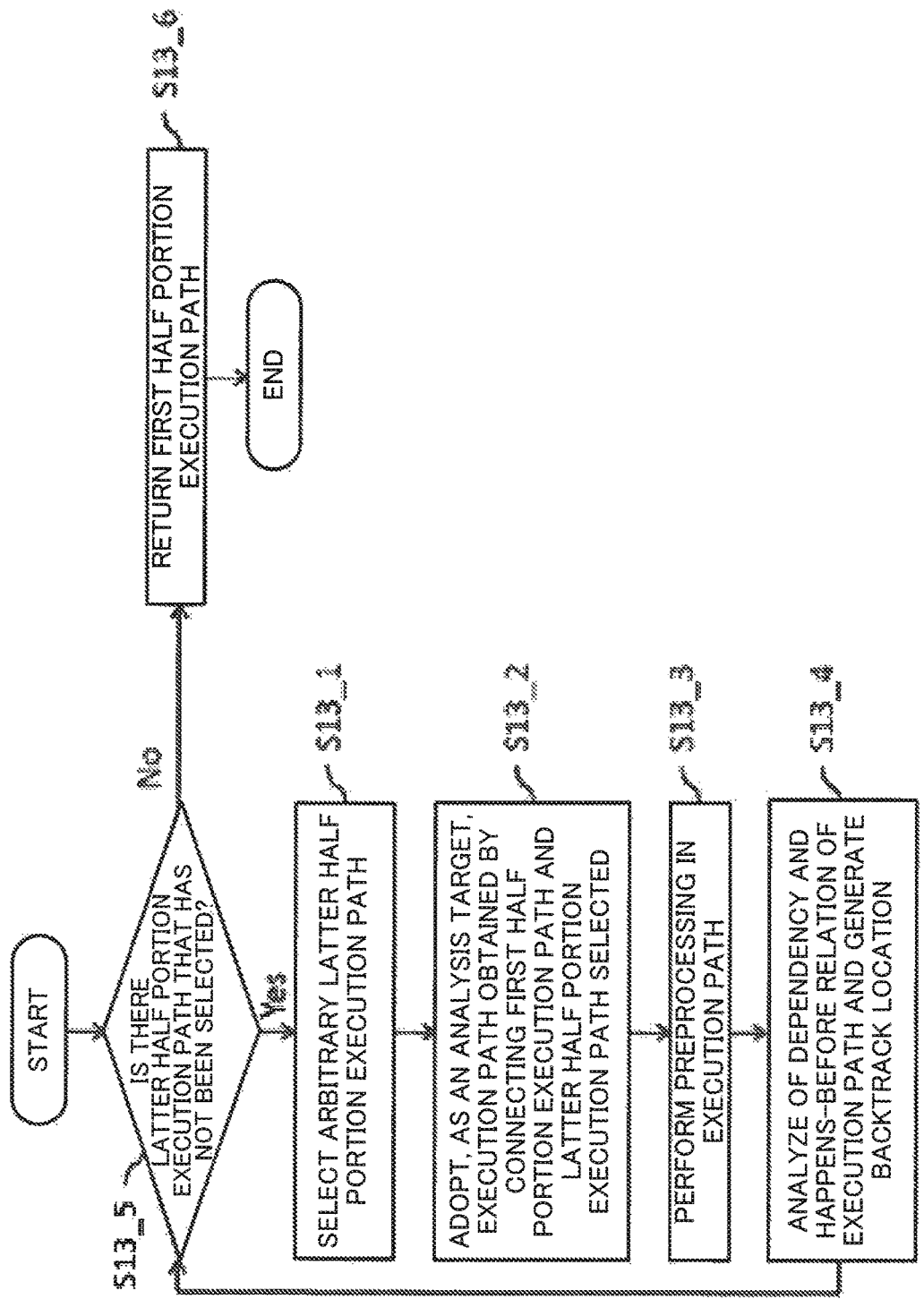
FIG. 6 is a flow diagram illustrating the details of a portion of step 13 in the first exemplary embodiment of the present invention.

On the other hand, in a case where one or more latter half portion execution paths are included in the execution path information D12, the distributed-environment-model dependency analysis unit 12 performs processing according to a flow of FIG. 6. First, the distributed-environment-model dependency analysis unit 12 selects an arbitrary path from one or more latter half portion execution paths included in the execution path information D12 (step S13_1). Next, the distributed-environment-model dependency analysis unit 12 adopts, as an analysis target, an execution path obtained by connecting the first half portion execution path included in the execution path information D12 and the latter half portion execution path selected in step S13_1 in this order (step S13_2).

Next, the distributed-environment-model dependency analysis unit 12 performs pre-processing for analyzing the happens-before relation to the execution path of the analysis target (step S13_3). Further, the distributed-environment-model dependency analysis unit 12 performs analysis of the dependency and the happens-before relation and performs generation of the backtrack location (step S13_4). In a case where there are multiple latter half portion execution paths included in the execution path information D12, the distributed-environment-model dependency analysis unit 12 repeats steps S13_1 to S13_4 until all of the multiple latter half portion execution paths are selected in step S13_1 (step S13_5). Finally, the distributed-environment-model dependency analysis unit 12 returns the first half portion execution path D13 in which the backtrack location is generated to the distributed-environment-model search unit 11 (step S13_6), and terminates step S13.

Figure 7:
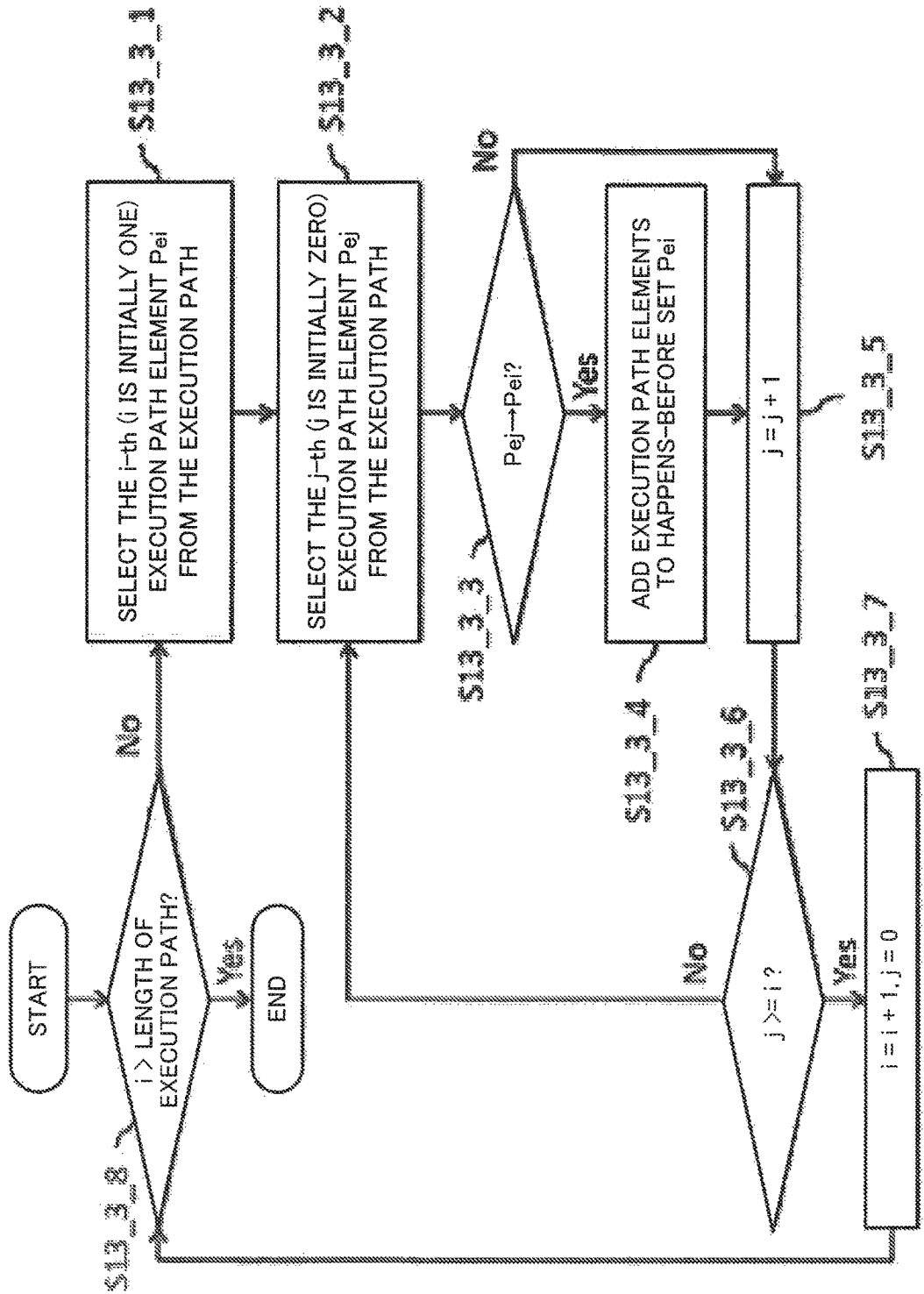
FIG. 7 is a flow diagram illustrating the details of a portion of step S13 in the first exemplary embodiment of the present invention.

Step S13_3 will be explained in detail with reference to FIG. 7. In step S13_3, with regard to each execution path element Pe in the execution path of the analysis target, the distributed-environment-model dependency analysis unit 12 derives the execution path element Pe having the transition in the happens-before relation to the transition of the execution path element Pe (the transition always occurs at an earlier point in time). Therefore, for each execution path element Pe, the distributed-environment-model dependency analysis unit 12 prepares a data structure (happens-before set) holding a set of the execution path element Pe having the transition in the happens-before relation to the transition of the element.

First, the distributed-environment-model dependency analysis unit 12 selects the i-th (i is initially one) execution path element Pei from the execution paths of the analysis target (execution path element Pe0 to Pex) (step S13_3_1). Next, the distributed-environment-model dependency analysis unit 12 selects the j-th (j is initially zero) execution path element Pej (step S13_3_2). Further, the distributed-environment-model dependency analysis unit 12 compares the transition of the execution path element Pei with the transition of the execution path element Pej (step S13_3_3). In a case of [the transition of the execution path element Pej→the transition of the execution path element Pei] (happens-before relation), the distributed-environment-model dependency analysis unit 12 adds the execution path element Pej and all the execution path elements included in the happens-before set of the execution path element Pej to the happens-before set (initially empty) of the execution path element Pei (step S13_3_4).

In the comparison in step S13_3_3, more specifically, the distributed-environment-model dependency analysis unit 12 performs comparison to determine whether a value of a reception message recv of the transition of the execution path element Pei (identification information about the received message) and a value of a transmission message send of the execution path element Pej (identification information about the transmitted message) match each other or not. In a case of matching, the distributed-environment-model dependency analysis unit 12 determines that there is the happens-before relation. Next, the distributed-environment-model dependency analysis unit 12 increases the value of j by one (step S13_3_5). The distributed-environment-model dependency analysis unit 12 repeats steps S13_3_2 to S13_3_5 until the value of j becomes equal to or more than i (step S13_3_6). When the value of j becomes equal to or more than i, the distributed-environment-model dependency analysis unit 12 increases the value of i by one, and sets the value of j to zero (step S13_3_7). The distributed-environment-model dependency analysis unit 12 repeats steps S13_3_1 to S13_3_7 until the value of i becomes more than the length of the execution path of the analysis target (step S13_3_8), and terminates step S13_3.

Figure 8:
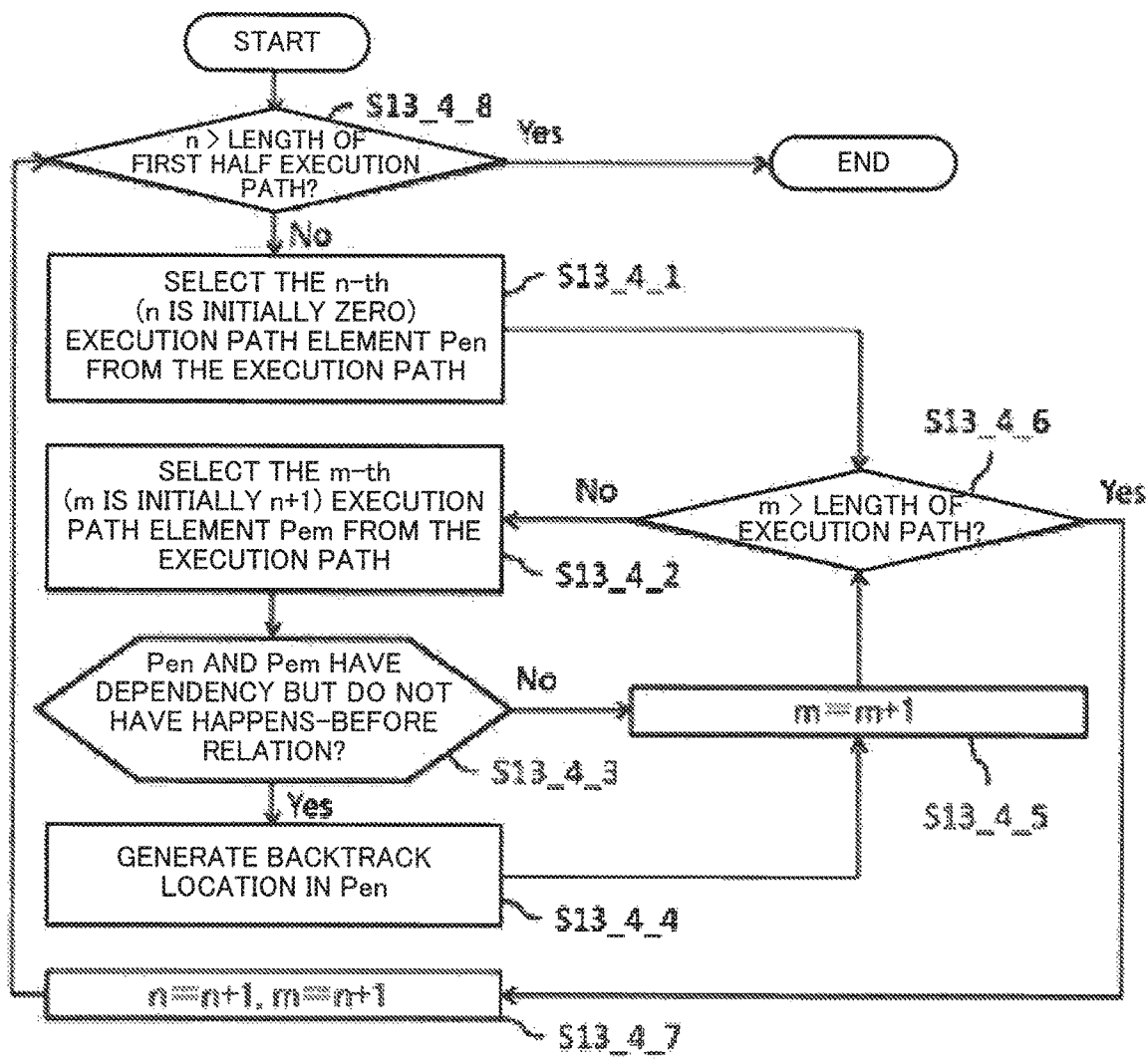
FIG. 8 is a flow diagram illustrating the details of a portion of step S13 in the first exemplary embodiment of the present invention.

Step S13_4 will be explained in detail with reference to FIG. 8. First, the distributed-environment-model dependency analysis unit 12 selects the n-th (n is initially zero) execution path element Pen from the range of the first half portion execution path in the execution path of the analysis target (step S13_4_1). Next, the distributed-environment-model dependency analysis unit 12 selects the m-th (m is initially n+1) execution path element Pem from the execution path of the analysis target (step S13_4_2). Further, the distributed-environment-model dependency analysis unit 12 compares the transition of the execution path element Pen with the transition of the execution path element Pem, and checks whether or not they "have dependency but do not have happens-before relation" (step S13_4_3).

In the comparison in step S13_4_3, with regard to the dependency, the distributed-environment-model dependency analysis unit 12 determines that there is the dependency when the operation subject nodes of the transitions of the execution path elements Pen and Pem are the same, and the state change flags change_flag of both of the transitions are true. In the comparison in step S13_4_3, with regard to the happens-before relation, the distributed-environment-model dependency analysis unit 12 determines that there is the happens-before relation when an execution path a is included in the happens-before set of the execution path element Pem.

In a case where it is understood that the execution path elements Pen and Pem "have dependency but do not have happens-before relation" in step S13_4_3, the distributed-environment-model dependency analysis unit 12 generates a backtrack location by selecting the execution path element Pel at the most forward side in the execution path of the analysis target from among the execution path elements included in the happens-before set of the execution path element Pem. and adding the transition of the execution path element Pel to the backtrack set of the execution path element Pen (step S13_4_4). Next, the distributed-environment-model dependency analysis unit 12 increases the value of m by one (step S13_4_5). The distributed-environment-model dependency analysis unit 12 repeats step S13_4_2 to S13_4_5 until the value of m becomes longer than the length of the execution path of the analysis target (step S13_4_6). When the value of m becomes more than the length of the execution path of the analysis target, the distributed-environment-model dependency analysis unit 12 increases the value of n by one, and sets the value of m to n+1 (step S13_4_7). The distributed-environment-model dependency analysis unit 12 repeats steps S13_4_1 to S13_4_7 until the value of n becomes more than the length of the first half portion execution path (step S13_4_8), and terminates step S13_4.

Figure 9:
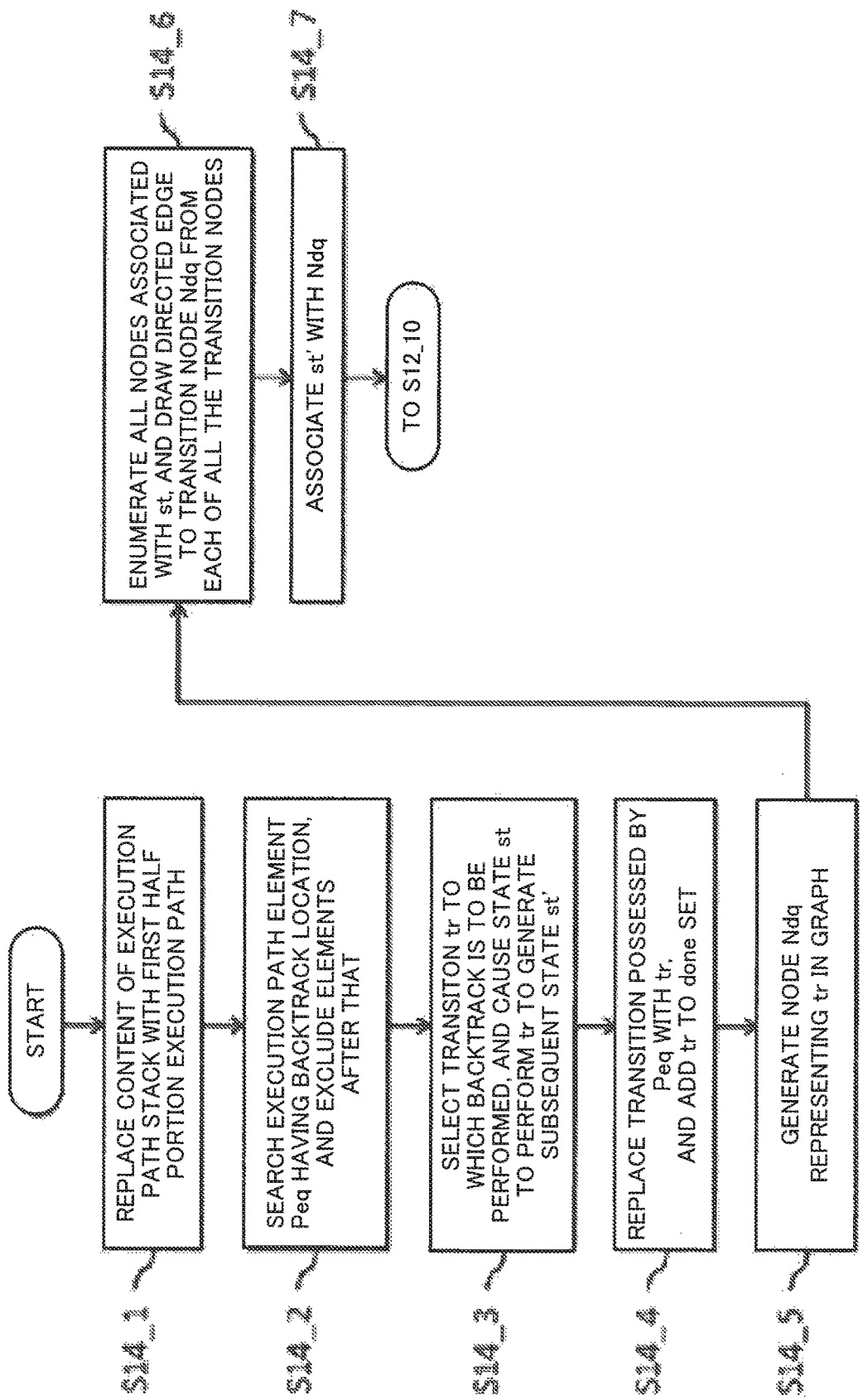
FIG. 9 is a flow diagram illustrating the details of a portion of step S14 in the first exemplary embodiment of the present invention.

Step S14 will be explained in detail with reference to FIG. 9. First, the distributed-environment-model search unit 11 replaces the content of the execution path stack with the first half portion execution path D13 obtained in step S13 (step S14_1). Next, the distributed-environment-model search unit 11 searches the execution path element Peq at the most rearward side from among the execution path elements Pe having the backtrack location (=the difference set obtained by subtracting the done set from the backtrack set is not empty) in the execution path stack, and removes the execution path element after that (not including Peq) from the execution path stack (step S14_2). Next, the distributed-environment-model search unit 11 selects an arbitrary transition tr included in the backtrack set of the execution path element Peq but not included in the done set, and makes the state st possessed by the execution path element Peq perform the transition tr, and generates a subsequent state st' (step S14_3).

Further, the distributed-environment-model search unit 11 replaces the transition possessed by the execution path element Peq with tr, and adds tr to the done set (step S14_4). Next, the distributed-environment-model search unit 11 makes the graph managed by the searched-transition-history management unit 14 generate the transition node Ndq representing the transition tr (step S14_5). Next, the distributed-environment-model search unit 11 enumerates all the transition nodes associated with the state st in the searched state transition association information management unit 15, and draws a directed edge to the transition node Ndq from each of all the transition nodes (step S14_6). Further, the distributed-environment-model search unit 11 associates the state st" and the transition node Ndq with the searched state transition association information management unit 15 (step S14_7). Thereafter, the distributed-environment-model search unit 11 proceeds to step S12_10. The procedure subsequent thereto is the same as one described in the explanation in step S12, and the procedure subsequent thereto is therefore omitted.

[Effects]

During the search with model checking, the model checking device 1 for distributed model checking saves and manages the searched state (the searched state management unit 13). At the same time, the model checking device 1 for distributed model checking saves and manages a searched transition by using a graph structure representing a history that can be obtained by distinguishing, for each path, a content of a transition performed in a search and the order thereof (the searched-transition-history management unit 14). When the searched state and the transition are managed, the model checking device 1 for distributed model checking makes an association indicating which transition is performed from the searched state (the searched state transition association information management unit 15).

Then, when the searched state is attained during the search with the model checking, the searched state and the history information of transitions performed therefrom are associated, saved, and managed. Therefore, the model checking device 1 for distributed model checking obtains the history information, analyzes the dependency and the happens-before relation by deeming that the same transition as the history information is artificially performed after the attained state, generates the backtrack location as necessary, and terminates the search. Accordingly, the model checking device 1 for distributed model checking can search the dependency and the happens-before relation without searching the searched state and subsequent states again. Even in a case where the DPOR is applied to the model checking for the distributed-environment-model, the model checking device 1 for distributed model checking can terminate search of the searched state and subsequent states. As a result, the efficiency of the search can be enhanced.

<Second Exemplary Embodiment>

Subsequently, a second exemplary embodiment of the present invention will be explained in detail with reference to drawings. Hereinafter, explanation about the same portions as those of the first exemplary embodiment will be omitted, and only the difference portions will be explained.

[Configuration]

First, a configuration of the second exemplary embodiment according to the present invention will be explained in detail with reference to FIG. 1.

When receiving the verification information D11 including the distributed-environment-model and the property that is to be satisfied by the distributed-environment-model via an input device from a user, the distributed-environment-model search unit 11 executes the model checking by using the verification information D11, and returns the verification result D11 including success or failure of the property and a counter example indicating that in a case where the property is not satisfied to the user via an output device.

The distributed-environment-model is assumed to be a model representing an environment of network controlled by OpenFlow (OpenFlow network). The specification may be any specification as long as it is a state transition system according to the specification of OpenFlow. The description format of the distributed-environment-model may be any format as long as processing can be performed with a computer. The second exemplary embodiment will be explained while the specification of the distributed-environment-model is explained as one which will be shown below.

The definition of the state according to the distributed-environment-model of the second exemplary embodiment will be explained. The state is defined as a set including six items, i.e., (T, S, C, P, M, Q), as elements.

T is a set of terminals. An element t in T (t∈T) has a variable sv representing the state thereof. S is a set of switches. An element s in S (s∈S) has a variable E representing a set of flow entries installed on the switch. An element e in E (e∈E) is a flow entry, and is defined as a pair (mr, af) with a value mr representing a contet of matching rule and a value af representing a content of an action field. C is a set of controllers, and an element c in C (c∈C) has a variable V representing a set of variables globally treated by each operation model of the controller c. An element v in V (v∈V) is one of variables globally treated by the operation model of the controller, and is defined as a pair (vn, vv) with a value vn representing the name of the variable and a value vv representing the content of the variable. P is a set of packets, and an element p in P (p∈P) has a variable pv representing the content of the packet. M is a set of OpenFlow messages, and an element m in M (m∈M) has a variable my representing the content of the OpenFlow message. Q is a set of communication ports, and an element q in Q (q∈Q) is a communication port achieved with an FIFO (First In, First Out) queue storing the packet and the OpenFlow message.

Each of the terminals, the switches, and the controllers has communication ports for communicating with other the terminals, switches, and controllers. Each of them has the communication ports for the transmission and the reception to the terminals, switches, and controllers capable of communicating mutually one by one.

A transmission communication port for a certain terminal, switch, and controller is a reception communication port for a terminal, switch, and controller other than the certain terminal, switch, and controller, and vice versa. The terminal, switch, and the controller may be collectively referred to as a node.

The definition of the transition of the distributed-environment-model according to the second exemplary embodiment will be explained. The transition indicates that how the state of the model is changed when any one of the terminal, the switch, and the controller existing in the distributed-environment-model (OpenFlow network) executes an operation of a particular unit. More specifically, the operation of the particular unit includes six types as follows.

1. Packet transmission by terminal
2. Packet reception by terminal
3. Flow entry application by switch
4. Packet-In message transmission by switch
5. OpenFlow message reception by switch
6. Program execution by controller Hereinafter, the above six types of operations will be explained in detail.

The packet transmission by the terminal will be explained. The terminal can execute packet transmission operation in accordance with the state sv of itself. In the packet transmission of the terminal, the terminal t generates a single packet p, and stores the packet p into a transmission communication port of the terminal t (=packet reception communication port for a certain switch), and changes the content of the state sv of itself (in some cases, the content may not be changed).

The packet reception by the terminal will be explained. The terminal can execute the packet reception operation in a case where one or more packets are stored in the packet reception communication port of itself. In the packet reception of the terminal, the terminal t retrieves the packet p that is stored first from the packet reception communication port q of itself storing one or more packets. Then, the content of the state sv of itself is changed in accordance with the content pv of the packet p (in some cases, the content may not be changed).

The flow entry application by the switch will be explained. In a case where the switch stores one or more packets in the packet reception communication port of itself, and the switch has a flow entry that can be applied to a packet that is stored first in the packet reception port, the switch can execute the flow entry application operation. In the flow entry application operation of the switch, first, the switch retrieves the packet p that is stored first from the packet reception communication port q of the switch s storing one or more packets. Next, the switch compares a matching rule mr of each flow entry possessed by the switch s with a content pv of the packet p, and selects a flow entry e that can be applied to the packet p. Finally, the switch executes an operation in accordance with the action field af of the flow entry e.

The Packet-In message (one of OpenFlow messages) transmission by the switch will be explained. In a case where the switch stores one or more packets in the packet reception communication port of itself, and the switch does not have a flow entry that can be applied to the packet stored first in the packet reception port, the switch can execute the Packet-In message transmission operation. In the Packet-In message transmission operation of the switch, first, the switch retrieves the packet p stored first from a packet reception communication port q1 of the switch s storing one or more packets. Next, the switch stores the Packet-In message m including information about the packet p to an OpenFlow message transmission communication port q2 associated with the controller.

The OpenFlow message reception by the switch will be explained. In a case where the switch stores one or more OpenFlow messages in the OpenFlow message reception communication port of itself, the switch executes the OpenFlow message reception operation. In the OpenFlow message reception operation of the switch, first, the switch retrieves the OpenFlow message m that is stored first from the OpenFlow message reception communication port q of the switch s storing one or more OpenFlow messages. Next, the switch executes an operation in accordance with the content my of the OpenFlow message m.

The program execution by the controller will be explained. In a case where the controller stores one or more OpenFlow messages in the OpenFlow message reception communication port of itself, the controller can execute the program execution operation. In the program execution operation of the controller, first, the controller retrieves a single OpenFlow message m that is stored first from the OpenFlow message reception communication port q of the controller c storing one or more OpenFlow messages. Next, the controller refers to the content my of the OpenFlow message m, and executes an operation which is accordance with the my in operations of the controller defined in the distributed-environment-model included in the verification information D11 (in a case where it is not defined, the switch executes a default operation specified in the OpenFlow specification).

In the second exemplary embodiment, by considering the specification of the distributed-environment-model used here and the algorithm of the DPOR, it is defined that there is the dependency, in a case where the following condition is satisfied.

"The operation subject node operating with the transition t1 (any one of the terminal, the switch, and the controller) and the operation subject node operating with the transition t2 are the same."

In the second exemplary embodiment, by considering the specification of the distributed-environment-model used here and the algorithm of the DPOR, the happens-before relation is defined as follows.

1. "t1→t2: in a case where a packet or a message transmitted with the transition t1 and a packet or an Open-Flow message received with the transition t2 are the same"

2. "t1→t2: in a case where a flow entry installed with the transition t1 and a flow entry applied with the transition t2 are the same"

3. "t1→t2: in a case where a packet or an OpenFlow message pm1 received with the transition t1 and a packet or an OpenFlow message pm2 received with the transition t2 are stored in the same reception communication port q, and the transition t3 for storing pm1 in q and the transition t4 for storing pm2 in q are t3→t4"

4. "t1→t3: in a case where t1→t2 and t2→t3"

The data structure of the transition will be explained. The transition is a group of seven elements, i.e., (node, type, send, recv, port, install, apply). The node is an operation subject operating with the transition (any one of the terminal, the switch, and the controller). The type is a type of an operation causing a transition (a value representing any one of six types of operations). The element "send" represents a set of packets or OpenFlow messages transmitted with that transition. The element "recv" represents a packet or an OpenFlow message received in that transition. The element "port" represents a reception communication port storing a packet or an OpenFlow message received with that transition. The element "install" represents a flow entry installed with that transition. The element "apply" represents a flow entry applied with that transition. The transition data based on this data structure is generated upon appropriately setting a value of each field in accordance with the content of the transition when the state transfers in the search performed by the distributed-environment-model search unit 11.

[Operation]

Subsequently, an operation according to the second exemplary embodiment will be explained in detail. The basic flow is the same as the first exemplary embodiment. Hereinafter, different portions will be explained.

Step S13_3 of FIG. 6 will be explained in detail with reference to FIG. 7. The flow of the procedure of step S13_3 is the same as that of the first exemplary embodiment. However, the content of step S13_3_3 is different, and therefore, only the content of step S13_3_3 will be explained, and the explanation about the contents other than that is omitted.

In step S13_3_3, the distributed-environment-model dependency analysis unit 12 compares the transition of the execution path element Pei with the transition of the execution path element Pej, and confirms whether or not it is a case where "the transition of the execution path element Pej→the transition of the execution path element Pei" (happens-before relation). More specifically, first, the distributed-environment-model dependency analysis unit 12 confirms whether or not the reception message recv of the transition of the execution path element Pei is included in the transmission message set send of the execution path element Pej. In a case where it is included, the distributed-environment-model dependency analysis unit 12 determines that there is the happens-before relation.

In a case where it is not included, the distributed-environment-model dependency analysis unit 12 compares a flow entry applied by the transition of the execution path element Pei with a flow entry installed by the transition of the execution path element Pej to determine whether or not they match each other. In a case of matching, the distributed-environment-model dependency analysis unit 12 determines that there is the happens-before relation.

In a case of not matching, the distributed-environment-model dependency analysis unit 12 compares the reception communication ports port used in the transitions of the execution path elements Pei and Pej to determine whether or not they match each other. In a case of not matching, the distributed-environment-model dependency analysis unit 12 determines that there is no happens-before relation.

In a case of matching, the distributed-environment-model dependency analysis unit 12 searches the execution path element Pea having the transition having send including the reception message recv of the transition of Pei and the execution path element Peb having the transition having send including the reception message recv of the transition of Pej from the execution path of the analysis target. Then, the distributed-environment-model dependency analysis unit 12 confirms whether or not Peb is included in the happens-before set of the execution path element Pea. In a case where Peb is included, the distributed-environment-model dependency analysis unit 12 determines that there is the happens-before relation. In a case where Peb is not included, the distributed-environment-model dependency analysis unit 12 determines that there is no happens-before relation.

Step S13_4 of FIG. 6 will be explained in detail with reference to FIG. 8. The flow of the procedure in step S13_4 is the same as the first exemplary embodiment. However, the content in step S13_4_3 is different, and therefore, only the content in step S13_4_3 will be explained, and the explanation about the contents other than step S13_4_3 will be omitted. In step S13_4_3, the distributed-environment-model dependency analysis unit 12 compares the transition of the execution path element Pen with the transition of the execution path element Pem, and determines whether or not they "have dependency but do not have happens-before relation". In the comparison in step S13_4_3, with regard to the dependency, in a case where the operation subject nodes node of the transitions of the execution path elements Pen and Pem match each other, the distributed-environment-model dependency analysis unit 12 determines that there is the dependency. The happens-before relation is the same as step S13_4_3 in the first exemplary embodiment, and therefore, the happens-before relation is omitted.

[Effects]

During the search with model checking, the model checking device for distributed model checking according to the present exemplary embodiment saves and manages the searched state (the searched state management unit 13). At the same time, the model checking device for distributed model checking according to the present exemplary embodiment saves and manages a searched transition by using a graph structure representing the history that can be obtained by distinguishing, for each path, a content of a transition performed in a search and the order thereof (the searched-transition-history management unit 14). When managing the searched state and the transition, the model checking device for distributed model checking according to the present exemplary embodiment associates which transition is performed from the searched state (the searched state transition association information management unit 15).

Then, when the searched state is attained during the search with the model checking, because the searched state and the history information of transitions performed therefrom are associated, saved, and managed, the model checking device for distributed model checking according to the present exemplary embodiment obtains the history information, analyzes the dependency and the happens-before relation by deeming that the same transition as the history information is artificially performed after the attained state, generates the backtrack location as necessary, and terminates the search. Accordingly, the model checking device for distributed model checking according to the present exemplary embodiment can search the dependency and the happens-before relation without searching the searched state and subsequent states again. Even in a case where the DPOR is applied to the model checking for the distributed-environment-model representing the OpenFlow network environment, the model checking device for distributed model checking according to the present exemplary embodiment can terminate search of the searched state and subsequent states. As a result, the efficiency of the search can be enhanced.

<Third Exemplary Embodiment>

Subsequently, a third exemplary embodiment of the present invention will be explained in details with reference to drawings. Hereinafter, explanation about the same portions as those of the first and second exemplary embodiments will be omitted, and only the difference portions will be explained.

[Configuration]

First, a configuration of the third exemplary embodiment according to the present invention will be explained in detail with reference to drawings.

Figure 10:
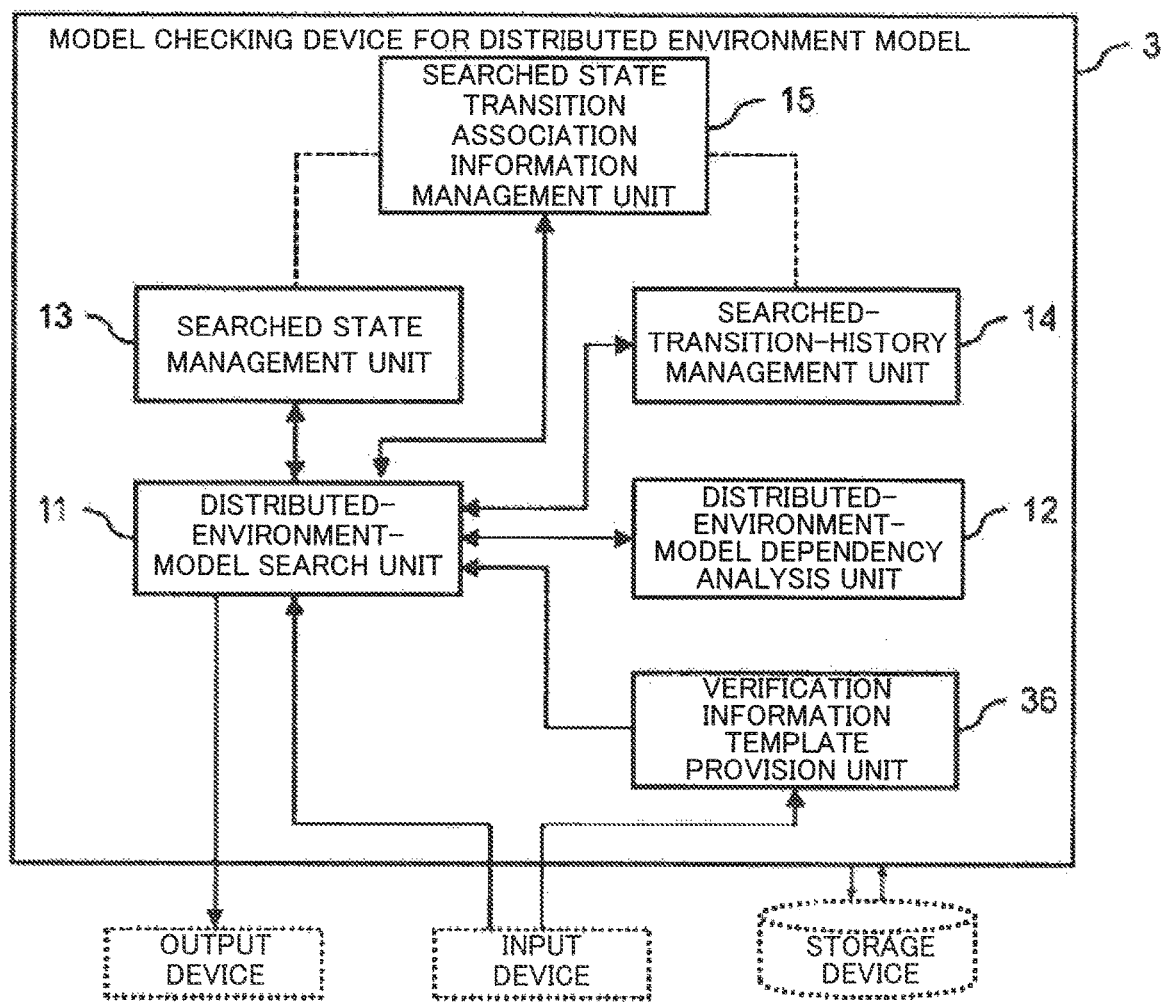
FIG. 10 is a functional block diagram illustrating a configuration of a model checking device for a distributed-environment-model according to a third exemplary embodiment of the present invention.

As illustrated in FIG. 10, a model checking device 3 for a distributed-environment-model according to the third exemplary embodiment includes the distributed-environment-model search unit 11, the distributed-environment-model dependency analysis unit 12, the searched state management unit 13, the searched-transition-history management unit 14, the searched state transition association information management unit 15, and a verification information template provision unit 36. The distributed-environment-model search unit 11 is configured to exchange information with the distributed-environment-model dependency analysis unit 12, the searched state management unit 13, the searched-transition-history management unit 14, the searched state transition association information management unit 15, and the verification information template provision unit 36. In order to associate the searched state managed by the searched state management unit 13 with the transition managed by the searched-transition-history management unit 14, the searched state transition association information management unit 15 manages the association relation thereof.

When a user inputs verification information, the verification information template provision unit 36 provides one or more typical templates for the property included in the verification information D11 in a selectable manner, and receives an input for selecting any one of the templates from the user. Then, the verification information template provision unit 36 has a function capable of using the selected template for a part or all of the definition of the property and inputting the template to the distributed-environment-model search unit 11.

The configurations of the distributed-environment-model search unit 11, the distributed-environment-model dependency analysis unit 12, the searched state management unit 13, the searched-transition-history management unit 14, and the searched state transition association information management unit 15 are the same as those of the first and second exemplary embodiments, and therefore, the explanation thereabout is omitted here.

[Operation]

In step S11 of FIG. 2, the user selects several desired templates from the verification information template provision device 36, and completes the verification information D11 by using them, and inputs the verification information D11 into the distributed-environment-model search unit 11. The user may generate the verification information D11 without using any template at all. The operations other than that are the same as those of the first and second exemplary embodiments, and therefore the explanation thereabout is omitted.

[Effects]

When the user uses the model checking device for the distributed-environment-model according to the present exemplary embodiment, because a load for generating the verification information D11 can be reduced, the efficiency of the entire verification can be improved as a result. According to the present exemplary embodiment, the same actions and effects as those of the first and second exemplary embodiments can be achieved.

As an example of application of the model checking devices for the distributed-environment-model according to the first to third exemplary embodiments explained above, when the distributed environment, for example OpenFlow network environment, is established or an environment at that time is changed, a tool for verifying the validity of distributed environments is considered.

Hereinafter, an example of reference aspect will be additionally described.

1. A model checking device for a distributed-environment-model, includes:

a distributed-environment-model search unit that adopts a first state as start point when obtaining information indicating a distributed-environment-model which can attain multiple states and move between the states with a predetermined transition achieved by execution of a predetermined operation capable of being executed in each of the states, searches the state that can be attained by the distributed-environment-model by executing a plurality of straight line movements for moving from the first state to a second state which is an end position in a straight line without branching at one or more transitions, and determines whether or not the searched state satisfies a predetermined property;

a searched state management unit that stores the searched state searched in the past;

a searched-transition-history management unit that stores an order of the transitions in each of the straight line movements executed in the past;

a searched state transition association information management unit that stores the transition when moving to another state in the search in the past in such a manner that the transition is associated with each of the searched states; and a distributed-environment-model dependency analysis unit that, when the distributed-environment-model search unit finishes a single straight line movement, analyzing a dependency and a happens-before relation of the plurality of transitions executed in a predetermined order in the straight line movement, and generates a backtrack location indicating a location to which a backtrack is performed in a path of the straight line movement, and, after the distributed-environment-model search unit finishes the search of a single straight line movement, starts another straight line movement with adapting the backtrack location as a start point.

2. The model checking device for the distributed-environment-model according to 1, wherein the distributed-environment-model search unit confirms whether the searched state during the search of N-th (N is an integer equal to or more than one) straight line movement is stored in the searched state management unit, terminates the search of the N-th the straight line movement with adapting the state as end position so that with in a case where the searched state is stored, and obtains one or more executed paths indicating the transition performed after the state which is the end position of the search of the N-th the straight line movement of the search in the past and an order thereof by using information stored in the searched-transition-history management unit and the searched state transition association information management unit, and the distributed-environment-model dependency analysis unit analyzes the dependency and the happens-before relation for the plurality of transitions in the predetermined order included in a continuous path obtained by connecting a path of the search of the N-th the straight line movement and each of one or more executed paths obtained by the search unit in this order, and generates the backtrack location in the path of the search of the N-th straight line movement.

3. The model checking device for the distributed-environment-model according to 2, wherein in a case where the distributed-environment-model search unit obtains the plurality of executed paths, the distributed-environment-model dependency analysis unit analyzes the dependency and the happens-before relation for each of the plurality of continuous paths obtained by connecting a path of the first straight line movement and each of the plurality of the executed paths in this order, and generates the backtrack location in the path of the first straight line movement.

4. The model checking device for the distributed-environment-model according to any one of 1 to 3, wherein the distributed-environment-model search unit searches a distributed-environment-model representing an OpenFlow network environment, and the distributed-environment-model dependency analysis unit analyzes the dependency and the happens-before relation in the OpenFlow network environment.

5. The model checking device for the distributed-environment-model according to any one of 1 to 4, wherein the distributed-environment-model search unit includes a function of receiving the property as an input from a user.

6. The model checking device for the distributed-environment-model according to 5, further includes:

a verification information template provision unit that provides a template of the property to the user in a selectable manner, and receives a user input for selecting one or more templates from among the provided templates, and the distributed-environment-model search unit obtains the verification information including the property which includes, as a part or all, the template received by the verification information template provision unit.

7. A computer readable non-transitory medium embodying a program, the program causing a computer to perform a method, the method includes:

adapting a first state as start point when obtaining information indicating a distributed-environment-model which can attain multiple states and move between the states with a predetermined transition achieved by execution of a predetermined operation capable of being executed in each of the states, searching the state that can be attained by the distributed-environment-model by executing a plurality of straight line movements for moving from the first state to a second state which is an end position in a straight line without branching at one or more transitions, and determining whether or not the searched state satisfies a predetermined property;

storing the searched state searched in the past;

storing an order of the transitions in each of the straight line movements executed in the past;

storing the transition when moving to another state in the search in the past in such a manner that the transition is associated with each of the searched states; and when finish of a single straight line movement, analyzing a dependency and a happens-before relation of the plurality of transitions executed in a predetermined order in the straight line movement, and generating a backtrack location indicating a location to which a backtrack is performed in a path of the straight line movement, and, after finish of the search of a single straight line movement, starting another straight line movement with adapting the backtrack location as a start point.

7-2. The method according to 7, wherein confirming whether the searched state during the search of N-th (N is an integer equal to or more than one) straight line movement is stored in the searched state management means, terminating the search of the N-th the straight line movement with adapting the state as end position so that with in a case where the searched state is stored, and obtaining one or more executed paths indicating the transition performed after the state which is the end position of the search of the N-th the straight line movement of the search in the past and an order thereof by using information stored in the searched-transition-history management means and the searched state transition association information management means, the dependency and the happens-before relation for the plurality of transitions in the predetermined order included in a continuous path obtained by connecting a path of the search of the N-th the straight line movement and each of one or more executed paths obtained by the search means in this order, and generating the backtrack location in the path of the search of the N-th straight line movement.

7-3. The method according to 7-2, wherein in a case where obtaining the plurality of executed paths, analyzing the dependency and the happens-before relation for each of the plurality of continuous paths obtained by connecting a path of the first straight line movement and each of the plurality of the executed paths in this order, and generating the backtrack location in the path of the first straight line movement.

7-4. The method according to any one of 7-1 to 7-3, wherein searching a distributed-environment-model representing an OpenFlow network environment, and analyzing the dependency and the happens-before relation in the OpenFlow network environment.

7-5. The method according to any one of 7-1 to 7-4, wherein including a function of receiving the property as an input from a user.

7-6. The method according to 7-5, the further includes:

providing a template of the property to the user in a selectable manner, and receiving a user input for selecting one or more templates from among the provided templates, and obtaining the verification information including the property which includes, as a part or all, the template received.

8. A model checking method for a distributed-environment-model includes:

adapting a first state as start point when obtaining information indicating a distributed-environment-model which can attain multiple states and move between the states with a predetermined transition achieved by execution of a predetermined operation capable of being executed in each of the states, searching the state that can be attained by the distributed-environment-model by executing a plurality of straight line movements for moving from the first state to a second state which is an end position in a straight line without branching at one or more transitions, and determining whether or not the searched state satisfies a predetermined property;

storing the searched state searched in the past;

storing an order of the transitions in each of the straight line movements executed in the past;

storing the transition when moving to another state in the search in the past in such a manner that the transition is associated with each of the searched states; and when finish of a single straight line movement, analyzing a dependency and a happens-before relation of the plurality of transitions executed in a predetermined order in the straight line movement, and generating a backtrack location indicating a location to which a backtrack is performed in a path of the straight line movement, and, after finish of the search of a single straight line movement, starting another straight line movement with adapting the backtrack location as a start point.

8-2. The model checking method for the distributed-environment-model according to 8, wherein confirming whether the searched state during the search of N-th (N is an integer equal to or more than one) straight line movement is stored in the searched state management unit, terminating the search of the N-th the straight line movement with adapting the state as end position so that with in a case where the searched state is stored, and obtaining one or more executed paths indicating the transition performed after the state which is the end position of the search of the N-th the straight line movement of the search in the past and an order thereof by using information stored, and analyzing the dependency and the happens-before relation for the plurality of transitions in the predetermined order included in a continuous path obtained by connecting a path of the search of the N-th the straight line movement and each of one or more executed paths obtained by the search unit in this order, and generating the backtrack location in the path of the search of the N-th straight line movement.

8-3. The model checking method for the distributed-environment-model according to 8-2, wherein obtaining the plurality of executed paths, analyzing the dependency and the happens-before relation for each of the plurality of continuous paths obtained by connecting a path of the first straight line movement and each of the plurality of the executed paths in this order, and generating the backtrack location in the path of the first straight line movement.

8-4. The model checking method for the distributed-environment-model according to any one of 8-1 to 8-3, wherein searching a distributed-environment-model representing an OpenFlow network environment, and analyzing the dependency and the happens-before relation in the OpenFlow network environment.

8-5. The model checking method for the distributed-environment-model according to any one of 8-1 to 8-4, wherein receiving the property as an input from a user.

8-6. The model checking method for the distributed-environment-model according to 8-5, further includes:

providing a template of the property to the user in a selectable manner, and receives a user input for selecting one or more templates from among the provided templates, and obtaining the verification information including the property which includes, as a part or all, the template received.

What is claimed is:

1. A model checking device for a distributed-environment-model, comprising:

a distributed-environment-model search unit, stored in a memory, that adopts a first state as start point When obtaining information indicating a distributed-environment-model which is configured to attain multiple states and move between the states with a predetermined transition achieved by execution of a predetermined operation capable of being executed in each of the states, searches the state that is configured to be attained by the distributed-environment-model by executing a plurality of straight line movements for moving from the first state to a second state which is an end position in a straight line without branching at one or more transitions, and determines whether or not the searched state satisfies a predetermined property;

a searched state management unit that stores the searched state searched in the past;

a searched-transition-history management unit that stores an order of the transitions in each of the straight line movements executed in the past;

a searched state transition association information management unit that stores the transition when moving to another state in the search in the past in such a manner that the transition is associated with each of the searched states; and a distributed-environment-model dependency analysis unit that, when the distributed-environment-model search unit finishes a single straight line movement, analyzing a dependency and a happens-before relation of the plurality of transitions executed in a predetermined order in the straight line movement, and generates a backtrack location indicating a location to which a backtrack is performed in a path of the straight line movement, and after the distributed-environment-model search unit finishes the search of a single straight line movement, start another straight line movement with adapting the backtrack location as a start point.

2. The model checking device for the distributed-environment-model according to claim 1, wherein the distributed-environment-model search unit confirms whether the searched state during the search of N-th (N is an integer equal to or more than one) straight line movement is stored in the searched state management unit, terminates the search of the N-th the straight line movement with adapting the state as end position so that with in a case where the searched state is stored, and obtains one or more executed paths indicating the transition performed after the state which is the end positon of the search of the N-th the straight line movement of the search in the past and an order thereof by using information stored in the searched-transition-history management unit and the searched state transition association information management unit, and the distributed-environment-model dependency analysis unit analyzes the dependency and the happens-before relation for the plurality of transitions in the predetermined order included in a continuous path obtained by connecting a path of the search of the N-th the straight line movement and each of one or more executed paths obtained by the search unit in this order, and generates the backtrack location in the path of the search of the N-th straight line movement.

3. The model checking device for the distributed-environment-model according to claim 2, wherein
in a case where the distributed-environment-model search unit obtains the plurality of executed paths,
the distributed-environment-model dependency analysis unit analyzes the dependency and the happens-before relation for each of the plurality of continuous paths obtained by connecting a path of N-th the straight line movement and each of the plurality of the executed paths in this order, and generates the backtrack location in the path of N-th the straight line movement.

4. The model checking device for the distributed-environment-model according to claim 1, wherein
the distributed-environment-model search unit searches a distributed-environment-model representing an OpenFlow network environment, and
the distributed-environment-model dependency analysis unit analyzes the dependency and the happens-before relation in the OpenFlow network environment.

5. The model checking device for the distributed-environment-model according claim 1, wherein
the distributed-environment-model search unit includes a function of receiving the property as an input from a user.

6. The model checking device for the distributed-environment-model according to claim 5, further comprising:
a verification information template provision unit that provides a template of the property to the user in a selectable manner, and receives a user input for selecting one or more templates from among the provided templates, and
the distributed-environment-model search unit obtains the property which includes, as a part or all, the template received by the verification information template provision unit.

7. A computer readable non-transitory medium embodying a program, the program causing a computer to perform a method, the method comprising:
adapting a first state as start point when obtaining information indicating a distributed-environment-mode which is configured to attain multiple states and move between the states with a predetermined transition achieved by execution of a predetermined operation capable of being executed in each of the states, searching the state that is configured to be attained by the distributed-environment-model by executing a plurality of straight line movements for moving from the first state to a second state which is an end position in a straight line without branching at one or more transitions, and determining whether or not the searched state satisfies a predetermined property;
storing the searched state searched in the past;
storing an order of the transitions in each of the straight line movements executed in the past;
storing the transition when moving to another state in the search in the past in such a manner that the transition is associated with each of the searched states; and
when a single straight line movement is finished, analyzing a dependency and a happens-before relation of the plurality of transitions executed in a predetermined order in the straight line movement, and generating a backtrack location indicating a location to which a backtrack is performed in a path of the straight line movement, and
after the search of a single straight line movement is finished, starting another straight line movement with adapting the backtrack location as a start point.

8. A model checking method having software executable instructions, stored in a memory, executed by a hardware processor for a distributed-environment-model comprising:
adapting a first state as start point when obtaining information indicating a distributed-environment-model which is configured to attain multiple states and. move between the states with a predetermined transition achieved by execution of a predetermined operation capable of being executed in each of the states, searching the state that is configured to be attained by the distributed-environment-model by executing a plurality of straight line movements for moving from the first state to a second state which is an end position in a straight line without branching at one or more transitions, and determining whether or not the searched state satisfies a predetermined property;
storing the searched state searched in the past;
storing an order of the transitions in each of the straight line movements executed in the past;
storing the transition when moving to another state in the search in the past in such a manner that the transition is associated with each of the searched states; and,
when a single straight line movement is finished, analyzing a dependency and a happens-before relation of the plurality of transitions executed in a predetermined order in the straight line movement, and generating a backtrack location indicating a location to which a backtrack is performed in a path of the straight line movement, and,
after the search of a single straight line movement is finished, starting another straight line movement with adapting the backtrack location as a start point.

* * * * *